(12) United States Patent
Matsuda et al.

(10) Patent No.: US 12,549,864 B2
(45) Date of Patent: Feb. 10, 2026

(54) IMAGING DEVICE

(71) Applicant: Panasonic Intellectual Property Management Co., Ltd., Osaka (JP)

(72) Inventors: Junpei Matsuda, Osaka (JP); Shinichi Yamamoto, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 89 days.

(21) Appl. No.: 18/764,260

(22) Filed: Jul. 4, 2024

(65) Prior Publication Data

US 2025/0024157 A1     Jan. 16, 2025

(30) Foreign Application Priority Data

Jul. 13, 2023    (JP) ................................ 2023-115212

(51) Int. Cl.
     *H04N 23/80*      (2023.01)
     *H04N 23/62*      (2023.01)
     *H04N 23/63*      (2023.01)

(52) U.S. Cl.
     CPC ............ *H04N 23/80* (2023.01); *H04N 23/62* (2023.01); *H04N 23/633* (2023.01)

(58) Field of Classification Search
     CPC .... H04N 23/62; H04N 23/633; H04N 23/617; H04N 23/80; H04N 23/64
     USPC ...................................................... 348/222.1
     See application file for complete search history.

(56) References Cited

U.S. PATENT DOCUMENTS

| | | | |
|---|---|---|---|
| 10,061,989 B2* | 8/2018 | Kanna | G06V 10/761 |
| 10,769,448 B2* | 9/2020 | Shinohara | G06V 20/52 |
| 11,113,532 B2* | 9/2021 | Kim | G06V 10/764 |
| 11,188,788 B2* | 11/2021 | Sato | G06F 18/2178 |
| 11,516,372 B2* | 11/2022 | Tanabe | G06N 3/08 |
| 11,546,553 B2* | 1/2023 | Tanabe | G06N 3/09 |
| 11,595,570 B2* | 2/2023 | Ueno | H04N 23/62 |
| 11,605,021 B1* | 3/2023 | Khare | G06N 5/046 |
| 2008/0199056 A1* | 8/2008 | Tokuse | H04N 23/61 382/118 |
| 2009/0244608 A1* | 10/2009 | Tsuji | H04N 1/00506 358/1.15 |
| 2016/0292512 A1* | 10/2016 | Kanna | G06V 10/774 |
| 2018/0349709 A1* | 12/2018 | Shinohara | G06V 20/52 |
| 2019/0080171 A1* | 3/2019 | Zheng | G06Q 30/0623 |

(Continued)

FOREIGN PATENT DOCUMENTS

| | | |
|---|---|---|
| JP | 2020-046928 A | 3/2020 |
| JP | 2021-033571 A | 3/2021 |

(Continued)

*Primary Examiner* — Pritham D Prabhakher

(74) *Attorney, Agent, or Firm* — Renner, Otto, Boisselle & Sklar, LLP

(57) ABSTRACT

An imaging device of the present disclosure includes: a communication unit that connects via a communication network to a provision server that provides a trained model used for image capturing; a connection unit that connects to a storage and outputs data to the storage; and a controller. The storage stores the trained model. The controller transmits photographing-related information obtained in association with image capturing to the provision server via the communication unit at a predetermined timing; and the controller stores, in the storage, a new trained model transmitted from the provision server in response to the photographing-related information.

12 Claims, 29 Drawing Sheets

(56) References Cited

U.S. PATENT DOCUMENTS

| | | | | |
|---|---|---|---|---|
| 2019/0147360 A1* | 5/2019 | Matsumoto | ............ | G06N 20/00 |
| | | | | 709/203 |
| 2019/0213443 A1* | 7/2019 | Cunningham | ....... | G06N 3/0895 |
| 2020/0042796 A1* | 2/2020 | Kim | ........................ | G06V 20/35 |
| 2020/0089994 A1 | 3/2020 | Sato | | |
| 2021/0136258 A1 | 5/2021 | Tanabe | | |
| 2021/0176430 A1 | 6/2021 | Tanabe | | |
| 2021/0248427 A1* | 8/2021 | Guo | ........................ | G06V 10/82 |
| 2021/0360150 A1* | 11/2021 | Ueno | .................... | H04N 23/661 |
| 2022/0392204 A1* | 12/2022 | Zhang | .................... | G06V 20/54 |
| 2023/0386164 A1* | 11/2023 | Park | ........................ | G06N 3/084 |
| 2023/0386185 A1* | 11/2023 | Park | .................... | G06V 10/761 |

FOREIGN PATENT DOCUMENTS

| | | | |
|---|---|---|---|
| JP | 2021-072600 A | 5/2021 | |
| JP | 2021-093568 A | 6/2021 | |
| JP | 2022-082478 A | 6/2022 | |
| JP | 2022-151256 A | 10/2022 | |
| JP | 2022-151257 A | 10/2022 | |

* cited by examiner

FIG. 4D

Update model information - Proposal model 2

Main camera type    S5 II
Target              Bird
Condition           Sea  ISO1600-3200  1/60  F2.8-4.0
Creator             ABC
Version             v1.2
Comment             Re-training mainly about wild birds that live on the coast
Example of images

W34

IMAGING DEVICE

CROSS-REFERENCE TO RELATED APPLICATIONS

This application claims the benefit of Japanese Patent Application No. 2023-115212 filed on Jul. 13, 2023, the content of which is incorporated herein by reference in its entirety.

TECHNICAL FIELD

The present disclosure relates to an imaging device that uses a trained model at the time of image capturing.

BACKGROUND ART

In recent years, machine learning has been widely used in various fields. Also in a camera, a trained model is used also at the time of image capturing (see JP 2021-072600 A2, JP 2021-093568 A2, and JP 2021-033571 A2, for example). The number of trained models used by a camera for photographing is not limited to one. A camera may use a plurality of trained models generated for respective processes. For example, JP 2021-072600 A2 describes that, by using trained models, an imaging device performs a detection process, a classification process, an area classification process, an image restoration process, a focus process, an exposure process, and a white balance process.

SUMMARY

Problems to be Solved by the Invention

Incidentally, accuracy of a trained model depends on training data. In addition, even for the same process, there are a plurality of trained models generated using different training data. In addition, a new trained model is sometimes generated by retraining. It is difficult for the user to determine whether the trained model stored in the camera is optimal for the user. It is also difficult for the user to select an optimal trained model from a plurality of trained models.

The present disclosure provides an imaging device that uses a trained model at the time of image capturing.

Solutions to the Problems

An imaging device of the present disclosure includes: a communication unit that connects via a communication network to a provision server that provides a trained model used for image capturing; a connection unit that connects to a storage or an external storage and outputs data to the storage or the external storage; and a controller. The storage or the external storage stores the trained model. The controller transmits photographing-related information obtained in association with image capturing to the provision server via the communication unit at a predetermined timing; and the controller stores, in the storage or the external storage, a new trained model transmitted from the provision server in response to the photographing-related information.

Such a general and specific aspect may be realized by a system, a method, a computer program, and a combination thereof.

Effects of the Invention

The imaging device of the present disclosure can receive provision of a trained model used in image capturing or update a trained model.

BRIEF DESCRIPTION OF DRAWINGS

FIG. 4D is an example of an operation screen displayed on the camera subsequent to FIG. 4C.

DETAILED DESCRIPTION

Figure 1:
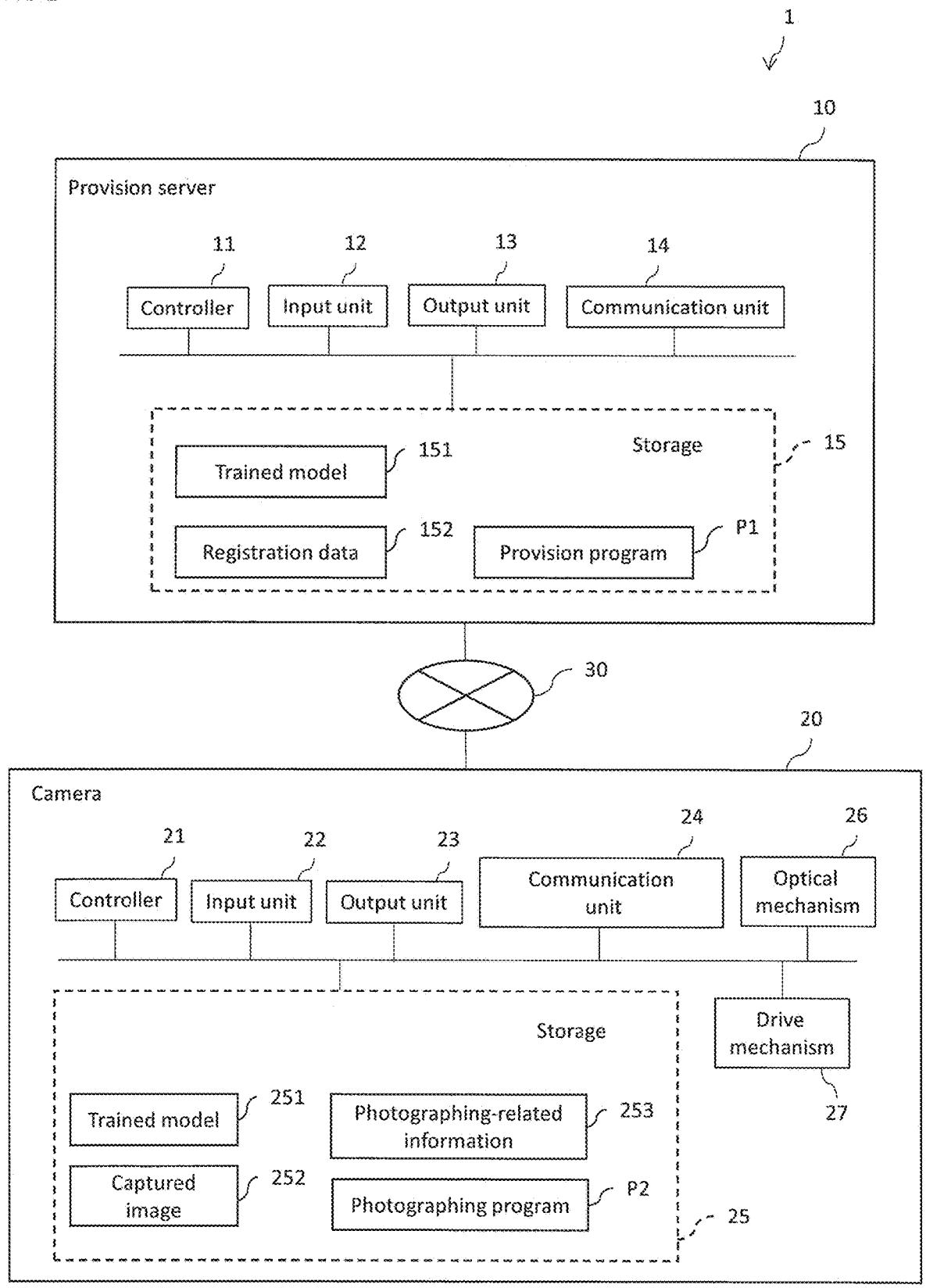
FIG. 1 is a block diagram illustrating a configuration of a provision server and a camera according to a first embodiment.

Hereinafter, embodiments of the present disclosure will be described using drawings while appropriately referring to the drawings. However, in the detailed description, unnecessary parts of the description of the conventional technique and of substantially the same configuration may be omitted. This is to simplify the description. In addition, the following description and the accompanying drawings are disclosed to make those skilled in the art sufficiently understand the present disclosure, and are not intended to limit the subject matter of the claims.

First Embodiment

It is known that a trained model is used in various controls in a camera. For example, a trained model is stored in a camera in advance at the time of manufacturing the camera. The user may update the trained model in accordance with his or her tendency of image capturing. In a provision system 1 according to a first embodiment, in the process of using a camera, a user who uses the camera can be provided with a trained model in accordance with his or her tendency of photographing. At this time, the user who uses the camera can use the trained model proposed by a server without searching for the trained model in accordance with the user's tendency of photographing.

1. Configuration 1-1. Provision System

FIG. 1 is a block diagram illustrating a configuration of the provision system 1 according to the first embodiment. In the provision system 1, a provision server 10 and a camera 20 are connected via a communication network 30. The provision system 1 selects a trained model used at the time of photographing, and proposes and provides the trained model to the camera 20 that is registered in advance in a service that provides a trained model. The camera 20 downloads and uses the trained model proposed from the provision server 10. Note that, in the example illustrated in FIG. 1, the number of cameras 20 connected to the provision server 10 is one. However, a plurality of cameras 20 may be connected to the provision server 10.

1-2. Provision Server

For example, as illustrated in FIG. 1, the provision server 10 is an information processing apparatus including a controller 11, an input unit 12, an output unit 13, a communication unit 14, and a storage 15.

The controller 11 is a controller that performs overall control of the provision server 10. For example, the controller 11 reads and executes a provision program P1 that is a computer program stored in the storage 15. As a result, the provision server 10 realizes a process of providing a trained model to the connected camera 20. The controller 11 may be various processors such as a central processing unit (CPU), a micro-processor unit (MPU), a graphic processor unit (GPU), a field programmable gate array (FPGA), a digital processing unit (DSP), and an application specific integrated circuit (ASIC), or may be a dedicated hardware circuit.

The input unit 12 can be the following units, for example: an operation button and a keyboard used for operation and data input; an operation unit such as a touch panel; and a microphone. The output unit 13 can be, for example, a display, a speaker, and a lamp that are used to output a processing result and data.

The communication unit 14 performs data communication between the provision server 10 and an external device such as the camera 20. The data communication is performed in a wired and/or wireless manner and complies with known communication standards. For example, the wired data communication may be performed by using, as the communication unit 14, a communication controller of a semiconductor integrated circuit that operates in conformity with the Ethernet (registered trademark) standard and/or the USB (registered trademark) standard. Furthermore, the wireless data communication may be performed by using, as the communication unit 14, a communication controller of a semiconductor integrated circuit that operates in conformity with the IEEE802.11 standard related to a wireless local area network (LAN) and/or a fourth/fifth/sixth generation mobile communication system, which is called 4G/5G/6G, related to mobile communications.

The storage 15 is a recording medium that records various types of information. The storage 15 is realized by, for example, a random-access memory (RAM), a read-only memory (ROM), a flash memory, a solid state drive (SSD), a hard disk drive, other storage devices, or an appropriate combination thereof. The storage 15 stores the provision program P1. Furthermore, the storage 15 stores various types of data and the like obtained by processing of selection, provision, and the like of a trained model in the provision server 10.

The storage 15 stores a plurality of trained models 151 that can be provided to the connected camera 20. For example, the storage 15 stores trained models 151 used for a plurality of different processes. Specifically, the storage 15 stores the trained models 151 for different processes, as processes used for image capturing, such as a detection process, an identification process, an autofocus process, and an automatic exposure control process. Furthermore, for example, also regarding the trained models used for respective ones of the processes, the storage 15 stores a plurality of trained models 151 trained with different training data. At the time of image capturing, the trained model 151 outputs a predetermined signal using as an input a signal obtained by a sensor including an imaging sensor of the imaging device.

For example, hereinafter, a description is given to each process and a trained model for each process.

The "detection process" detects an area that a subject occupies in an image to be photographed. For example, the trained model for the detection process may be generated by machine learning using training data including a relation between a plurality of combinations of an image and an area of a subject in an image.

The "identification process" is a process of identifying a type of subject in an image that is to be photographed. Examples of the type of subject may include a human, a dog, a cat, a bird, a flower, an insect, and the like. For example, the trained model for the identification process may be generated by machine learning using training data including a relation between a plurality of combinations of an image and a type of a subject in an image.

The "autofocus process (AF process)" is a process of adjusting a focus position such that a subject is in focus, at the time of photographing. For example, the trained model used for the autofocus process may be generated by machine learning using training data including a relation between a plurality of combinations of an image, distance measurement information (contrast, phase difference), and a control signal used to adjust a focus position at the time of image capturing.

The "automatic exposure control process (AE process)" controls a diaphragm, a gain, and/or a shutter speed so as to maintain brightness of an image at the time of photographing. For example, the trained model for the automatic exposure control process may be generated by machine learning using training data including a relation between (i) a plurality of combinations of an ISO sensitivity and an F value detected at the time of acquiring an image and (ii) a control signal.

In an "auto white balance process (AWB process)", white balance of an image is automatically adjusted at the time of photographing. For example, the trained model used for the auto white balance process may be generated by machine learning using training data including a relation between (i) a plurality of combinations of an image and color temperature information in the image and (ii) a control signal used for adjustment of white balance at the time of image capturing.

The storage 15 stores registration data 152 that is a list of cameras 20 registered as provision targets of the trained models 151. For example, the registration data 152 includes identification information of a user who uses the camera 20, model information of the camera 20, a type of the trained model stored in the camera 20, and the like. For example, when a request signal for use of the service is received from the camera 20, the registration data 152 is generated by adding information included in the request signal.

1-3. Camera

For example, as illustrated in FIG. 1, the camera 20 includes a controller 21, an input unit 22, an output unit 23, a communication unit 24, a storage 25, an optical mechanism 26, and a drive mechanism 27. The camera 20 can capture an image. An image that the camera captures may be a still image or a moving image.

The controller 21, the communication unit 24, and the storage 25 are realized by specific means similar to the controller 11, the communication unit 14, and the storage 15 described above. The storage 25 of the present embodiment is configured with a nonvolatile memory such as a flash memory. The input unit 22 is used to input a user's operation for image capturing and control. The input unit 22 may be, for example, an operation unit such as a shutter button, another operation button, and a touch panel. The output unit 23 is used to output a captured image and information. The output unit 23 may be, for example, a display (display unit) such as a liquid crystal monitor, a speaker, or a lamp.

The optical mechanism 26 includes a series of mechanisms related to image capturing, and captures an image under the control of the controller 21. Specifically, the optical mechanism 26 may include an imaging element, an optical element, an A/D converter, a diaphragm, a shutter, and the like. The imaging element may be a CMOS image sensor, a CCD image sensor, an NMOS image sensor, or the like. The optical element may be a focusing lens, a zooming lens, or an optical image stabilizer (OIS) lens. The focusing lens is a lens for changing a focusing state of a subject image formed on the imaging element. The zooming lens is a lens for changing a magnification of a subject image formed by an optical system. Each lens is configured with one or more lenses.

The drive mechanism 27 drives a lens included in the optical mechanism 26. For example, the drive mechanism 27 moves the lens along the optical axis of the optical system. In the drive mechanism 27, a configuration for driving the lens can be realized by a DC motor, a stepping motor, a servo motor, an ultrasonic motor, or the like.

The storage 25 stores a photographing program P2, a trained model 251, a captured image 252, and photographing-related information 253.

The photographing program P2 is read and executed by the controller 21, and performs various processes related to image capturing.

The trained model 251 is used for various processes related to photographing such as the detection process, the identification process, the autofocus process, the automatic exposure control process, the auto white balance process, and a noise reduction process. For example, the storage 25 stores a general-purpose trained model 251 in advance. The trained model 251 stored in the storage 25 may be updated in response to provision from the provision server 10 in accordance with the tendency of images captured by the user.

The captured image 252 is an image captured by the camera 20. The storage 25 accumulates a plurality of captured images 252 that are captured.

The photographing-related information 253 is information associated with the captured image 252 and obtained in association with image capturing. The photographing-related information 253 may include a model of a camera, a photographing target, a photographing condition, and the like. Furthermore, the photographing-related information is information that may affect generation and selection of a trained model.

The model of the camera is uniquely determined depending on the camera 20.

The photographing target may include a human, a dog, a cat, a bird, an insect, and the like. The photographing target may be identified by the trained model 251 that performs the identification process at the time of image capturing.

The photographing condition is determined depending on a value detected by the sensor, provided in the camera 20, including an imaging sensor or a value of the control signal used at the time of photographing, and is included in the photographing-related information 253. The photographing condition can include a photographing environment, a sensitivity, a shutter speed, an F value, and the like. The photographing environment is an environment in which an image is captured. For example, the photographing environment may include a forest, a town, a sea, a park, and the like. The sensitivity is ISO sensitivity at the time of photographing, and can be acquired by an ISO value.

The photographing-related information can be obtained even by a single image capturing operation. However, in the following description, the camera 20 uses photographing-related information obtained by gathering information obtained by a plurality of times of image capturing. Therefore, the obtained photographing-related information represents the tendency of photographing by the camera. By using this photographing-related information, the provision server 10 can recommend the trained model in accordance with the tendency of image capturing by the camera 20.

2. Operation 2-1. Operation of Provision System

With reference to the sequence diagram illustrated in FIG. 2, the overall process in the provision system 1 will be described.

The camera 20 transmits to the provision server 10 a request signal for registration of the camera 20 in a service with which the camera 20 can receive provision of a trained model (step S001).

When the registration in the service is permitted, the provision server 10 transmits a permission notification to the camera 20 (step S002). The provision server 10 further registers user information included in the received request signal, in the registration data 152 (step S003).

Upon receiving the permission notification, the camera 20 generates storage information of the trained model stored in the storage 25 and transmits the storage information to the provision server 10 (step S004).

The provision server 10 adds the received storage information to the registration data 152 (step S005).

When an image is captured, the camera 20 stores a captured image 252 in the storage 25 (step S006). In addition, the camera 20 stores the photographing-related information 253 in the storage 25 in association with the captured image 252 (step S007).

The camera 20 transmits the photographing-related information to the provision server 10 at a predetermined timing (step S008).

The provision server 10 searches for trained models suitable for the photographing-related information (step S009). In addition, the provision server 10 transmits to the camera 20 recommendation data including a list of retrieved trained models (step S010).

The camera 20 displays the received recommendation data on the output unit 23 (step S011). When a trained model included in the recommendation data is selected by the user, the camera 20 transmits to the provision server 10 a request signal to request transmission of the trained model (step S012).

The provision server 10 transmits the requested trained model to the camera 20 (step S013). In addition, the provision server 10 updates, in the registration data 152, the information of the trained model used by the camera 20 with the information of the transmitted trained model (step S014).

The camera 20 stores the received trained model in the storage 25 (step S015).

2-2. Operation of Provision Server

The provision server 10 performs processes of registration in the service, proposal of trained models, and provision of a trained model. Hereinafter, each process performed by the controller 11 of the provision server 10 will be described.

(Registration in Service)

Figure 2:
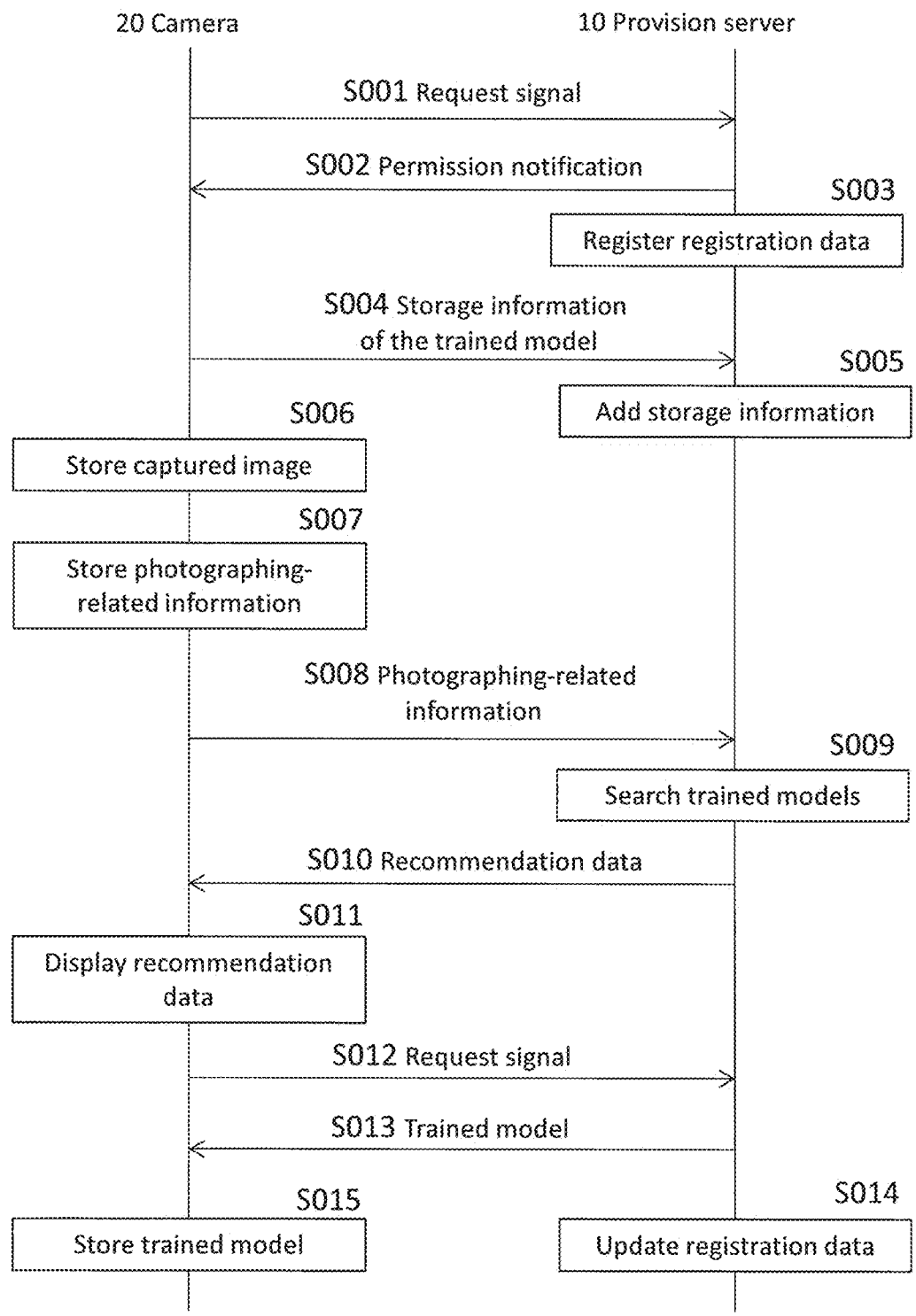
FIG. 2 is a sequence diagram illustrating transmission and reception of data between the provision server and the camera according to the first embodiment.

The controller 11 receives the request signal, for registration in the service, sent from the camera 20 via the communication unit 14 (step S001 in FIG. 2). For example, the request signal for registration in the service may include identification information of the user who uses the camera 20, model information of the camera 20, and the like.

When information included in the request signal satisfies a predetermined condition, the controller 11 transmits a permission notification to the camera 20 via the communication unit 14 (step S002 in FIG. 2). For example, when the request signal includes information necessary for registration and the camera 20 is a model compatible with the service, the controller 11 transmits the permission notification. The controller 11 further adds the information included in the request signal to the registration data 152 stored in the storage 15 (step S003 in FIG. 2).

The controller 11 receives storage information of the trained model that is transmitted from the camera 20 via the communication unit 24 in response to the permission notification (step S004 in FIG. 2). The storage information of the trained model is a list of all the information of the trained model currently stored in the camera 20. The controller 11 further adds the received storage information of the trained model to the registration data 152 in the storage 15 (step S005 in FIG. 2). The list of the information of the trained model may include the type of the trained model, the version of the trained model, and the like.

(Proposal of Trained Model)

The controller 11 acquires, via the communication unit 14, the photographing-related information that is obtained in relation to the photographing in the camera and is transmitted from the camera 20 (step S008 in FIG. 2). The controller 11 selects the trained model 151 suitable to the acquired photographing-related information from the plurality of trained models 151 stored in the storage 15 (step S009 in FIG. 2). For example, when the information indicating the training data related to the trained model 151 matches the information included in the photographing-related information, the controller 11 selects the trained model 151. Here, when there is a plurality of trained models 151 related to the acquired photographing-related information, the controller 11 may select a plurality of trained models 151.

The controller 11 transmits recommendation data including information indicating the selected trained model 151 to the camera 20 via the communication unit 14 (step S010 in FIG. 2). Here, when there is a plurality of selected trained models 151, the controller 11 may transmit to the camera the recommendation data including information indicating the plurality of trained models 151. For example, the recommendation data includes identification information of the trained model 151 and information indicating the training data used for training of the trained model 151.

Note that there is no limitation on the timing at which the controller 11 selects the trained model 151 on the basis of the photographing-related information and transmits the recommendation data. For example, the timing may be a timing at which the photographing-related information is newly received, a timing at which the new trained model 151 is stored in the storage 15, a periodic timing, or the like.

(Provision of Trained Model)

The controller 11 receives a request signal that is transmitted from the camera 20 in response to the recommendation data and requires transmission of the trained model 151 (step S012 in FIG. 2). The controller 11 transmits to the camera 20 the trained model 151 requested to be transmitted (step S013 in FIG. 2). After the controller 11 transmits the trained model 151 to the camera 20, the controller 11 updates the registration data 152 in the storage 15. Specifically, the controller 11 updates the information, included in the registration data 152, of the trained model 151 stored in the camera 20 (step S014 in FIG. 2).

2-3. Operation of Camera

The controller 21 performs, in addition to a process related to general image capturing, processes of registration in the service, registration of photographing-related information, transmission of photographing-related information, and acquisition of a trained model. Hereinafter, each process performed in the controller 21 will be described. Each process is performed when an operation screen is displayed on the output unit 23, which is a display, and the user inputs an operation via the input unit 22 in accordance with the operation screen. In the following description, the description will be given using an example of an operation screen displayed on the output unit 23 as necessary.

(Registration in Service)

The controller 21 transmits a request signal for registration in the service to the provision server 10 via the communication unit 24 (step S001 in FIG. 2). The request signal for registration in the service may include the identification information of the user who uses the camera 20, the model information of the camera, and the like.

When the request is permitted by the provision server 10, the controller 21 receives a permission notification from the provision server 10 via the communication unit 24 (step S002 in FIG. 2). Upon receiving the permission notification, the controller 21 transmits the storage information of the trained model stored in the storage 25 (step S003 in FIG. 2). In a case where a plurality of trained models are stored in the storage 25, the controller 21 transmits an information list of all the trained models as the storage information. As a result, the provision server 10 can register a list of information of the trained models that can be used in the camera 20. The list of information of the trained models may include types of the trained models, versions of the trained models, a model of the camera to which the trained models are compatible, and information of training data.

(Registration of Photographing-Related Information)

At the time of image capturing, the controller 21 stores a captured image in the storage 25 (step S006 in FIG. 2) and registers photographing-related information (step S007 in FIG. 2).

(Transmission of Photographing-Related Information)

The controller 21 transmits the photographing-related information accumulated in the storage 25 to the provision server 10 at a predetermined timing (step S008 in FIG. 2). The timing at which the photographing-related information is transmitted from the camera 20 to the provision server 10 may be, for example, a periodic timing, a timing at which the photographing-related information is requested from the user, a timing at which a predetermined amount of captured images 252 are accumulated in the storage 25 of the camera 20, a timing at which the tendency of the photographing-related information 253 associated with the captured images 252 has changed, or the like.

Here, the controller 21 transmits, to the provision server 10, the photographing-related information obtained by aggregating the information obtained by a plurality of times of image capturing. For example, the controller 21 may analyze a tendency of photographing from the photographing-related information 253 obtained through a plurality of times of image capturing, and may transmit an analysis result as the photographing-related information. Furthermore, the controller 21 may edit the photographing-related information accumulated in the storage 25, according to an operation from the user via the input unit 22, and may transmit the edited photographing-related information.

For example, assume that the user had many opportunities to "photograph a bird in the forest" until now but plans to "photograph a bird at the sea" in the future. In this case, even when the condition obtained from the photographing-related information 253 is transmitted, it is difficult to obtain an optimal trained model for the user. Therefore, the user can use the input unit 22 to edit the photographing-related information 253 in consideration of a future plan and then transmit the edited information to the provision server 10.

Furthermore, there may be a case where the user considers that the tendency of image capturing is not reflected to the photographing-related information 253. Also in this case, the user can use the input unit 22 to edit the photographing-related information 253 in accordance with the tendency of the image capturing by the user and transmit the edited photographing-related information 253 to the provision server 10.

Figure 3A:
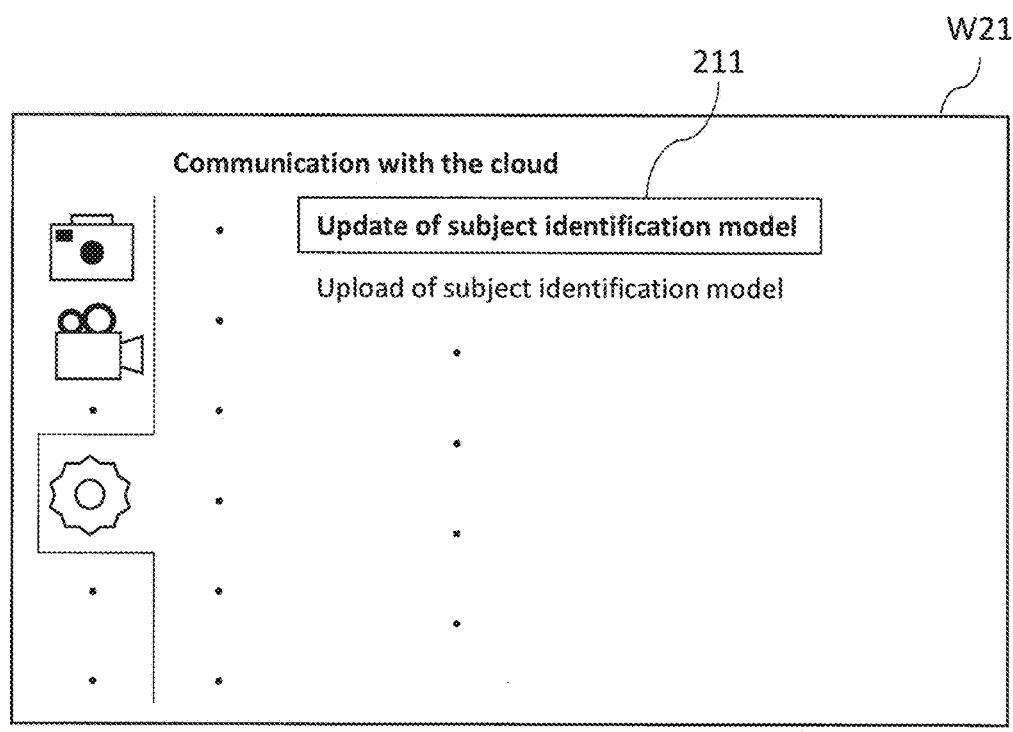
FIG. 3A is an example of an operation screen displayed on a camera for which update of a trained model is desired.
Figure 3B:
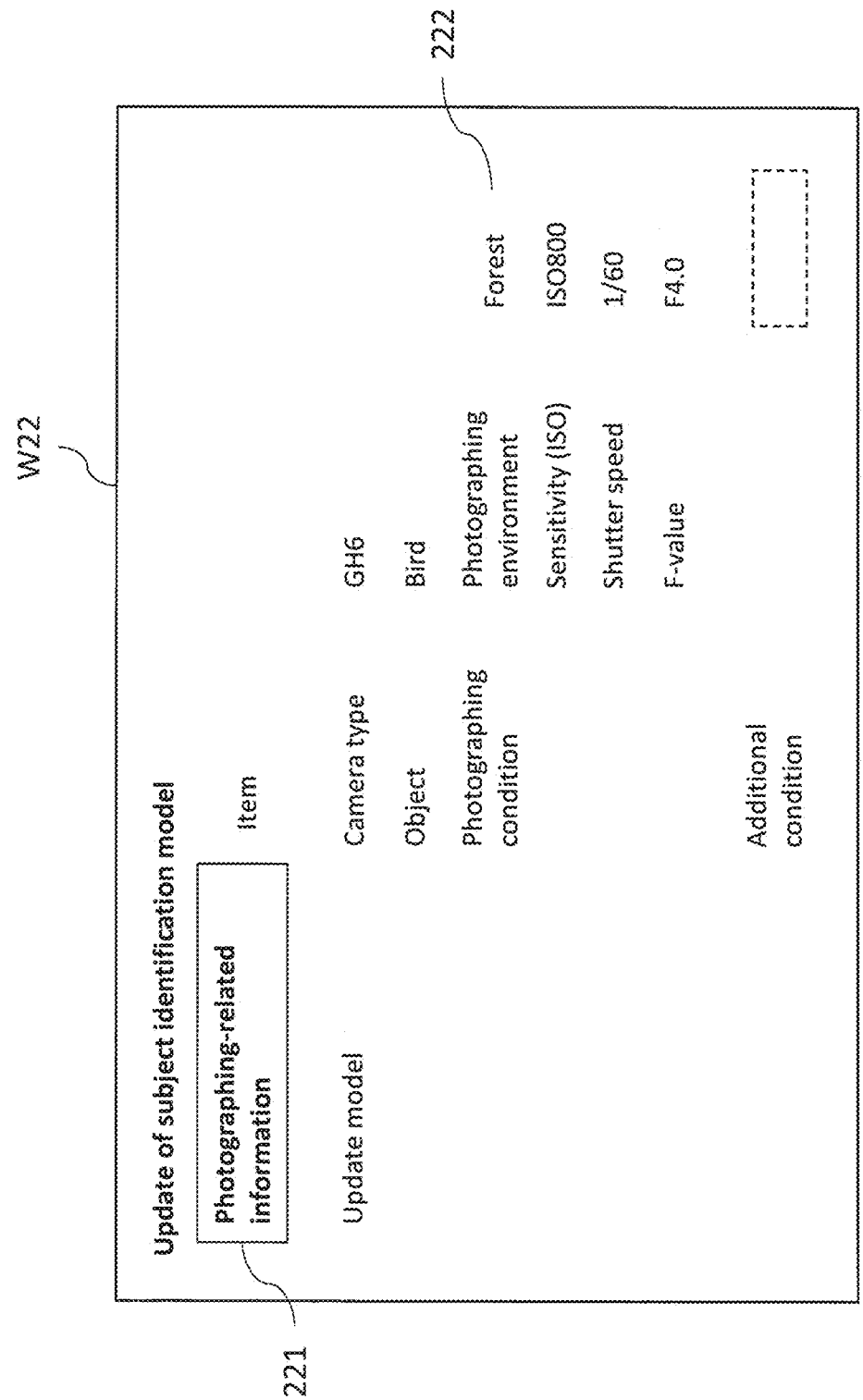
FIG. 3B is an example of an operation screen displayed on the camera subsequent to FIG. 3A.

FIG. 3A illustrates an example of an operation screen W21 that is displayed on the output unit 23 and is used for an operation to request transmission of the photographing-related information. Specifically, FIG. 3A illustrates an example of an operation screen on which an operation is performed to transmit the photographing-related information in order to update the trained model used in the identification process of a subject. When "Update of subject identification model" 211 is selected on the operation screen W21 in FIG. 3A, the controller 21 switches the operation screen W21 displayed on the output unit 23 to an operation screen W22 illustrated in FIG. 3B. In order to update the trained model, the user can select, from the operation screen W22, "Photographing-related information" 221 to perform operation of confirmation of the content of the photographing-related information that is to be transmitted to the provision server 10. For example, when the user wants to change the "photographing environment" of the "photographing condition", the user selects an item 222 of the "Photographing environment" from the operation screen W22. As a result, the controller 21 switches the operation screen W22 displayed on the output unit 23 to an operation screen W23 illustrated in FIG. 3C.

Figure 3C:
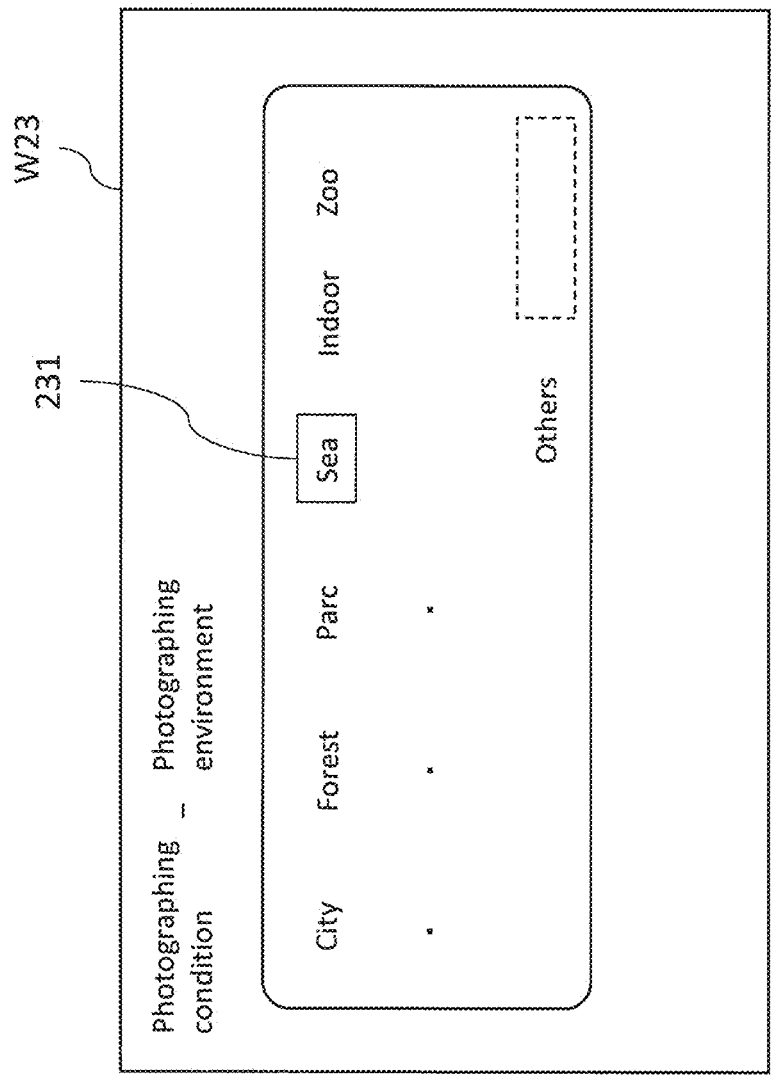
FIG. 3C is an example of an operation screen displayed on the camera subsequent to FIG. 3B.
Figure 3D:
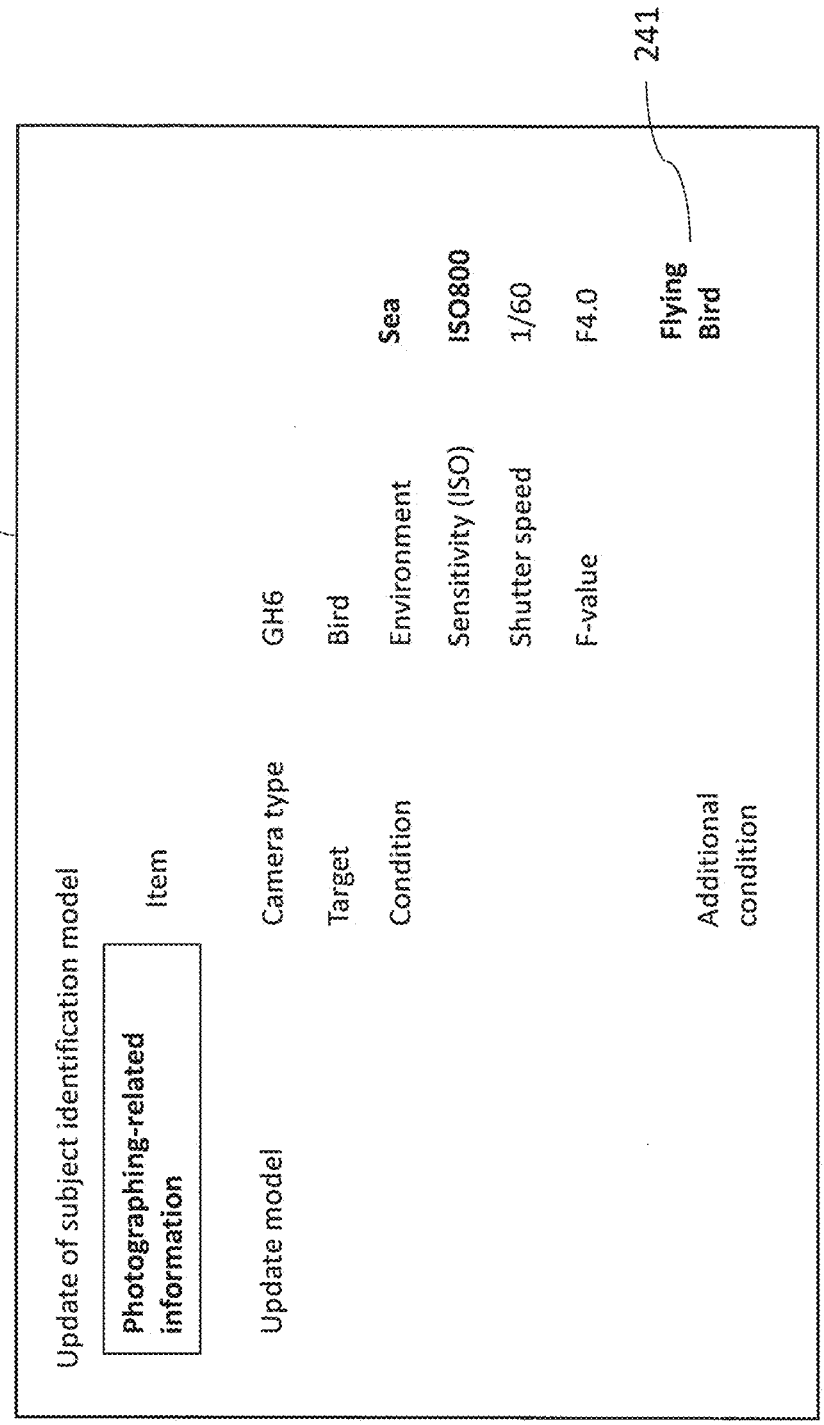
FIG. 3D is an example of an operation screen displayed on the camera subsequent to FIG. 3C.

The operation screen W23 shows a plurality of photographing environments to the user and causes the user to select a photographing environment to be the photographing condition. Note that the photographing environment that can be shown in advance on the operation screen is limited. Therefore, as illustrated in FIG. 3C, the operation screen W23 receives the input of the photographing environment by the user in the column of "Others". When "Sea" 231 is selected from the operation screen W23 as the "photographing environment", the controller 21 changes "Photographing environment" in an operation screen W24 to "Sea" as illustrated in FIG. 3D. Furthermore, when "Photographing environment" is changed from "Forest" to "Sea", a preferable ISO sensitivity can also be changed. Therefore, the user may also change "Sensitivity (ISO)". Furthermore, as illustrated in FIG. 3D, the user may register "Flying bird" 241 as an additional condition. The "additional condition" may be freely registered by the user. In the example illustrated in FIG. 3D, only one additional condition is added, but there is no limitation on the number of additional conditions that can be added.

Figure 3E:
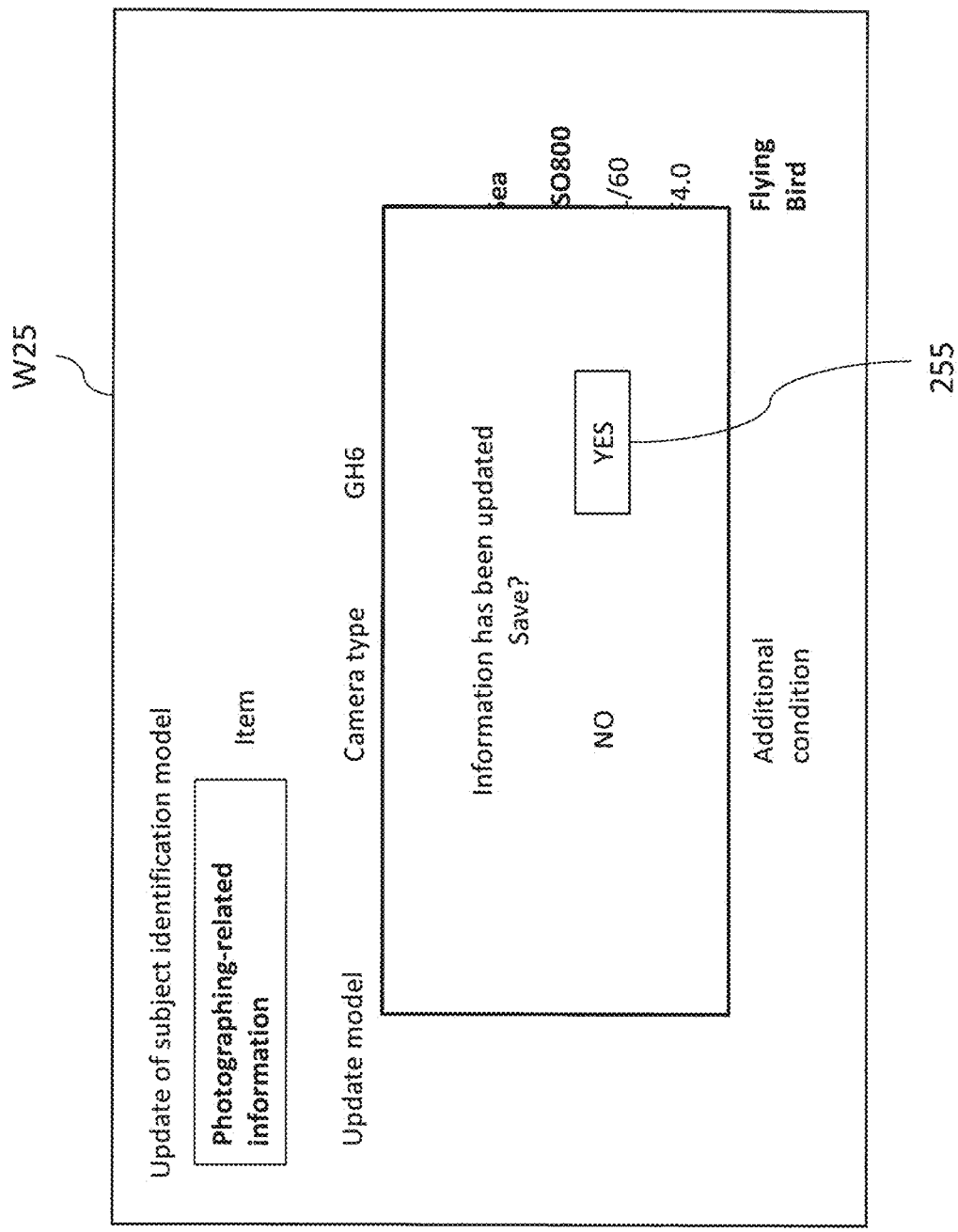
FIG. 3E is an example of an operation screen displayed on the camera subsequent to FIG. 3D.

Furthermore, when the photographing-related information is changed, it is confirmed whether to store the updated information as an example on an operation screen W25 illustrated in FIG. 3E. When "Yes" 255 is selected on the operation screen W25 illustrated in FIG. 3E, the controller 21 may subsequently confirm whether it is necessary to transmit the updated photographing-related information to the provision server 10. Furthermore, the controller 21 may confirm whether it is necessary to acquire a new trained model based on the updated photographing-related information from the provision server 10.

(Reception of Trained Model)

The controller 21 receives the recommendation data provided from the provision server 10 via the communication unit 24 (step S010 in FIG. 2). The controller 21 causes the output unit 23 to display the received recommendation data (step S011 in FIG. 2). In response to the recommendation data, the controller 21 transmits to the provision server 10 a request signal to request transmission of the trained model (step S012 in FIG. 2). In addition, the controller 21 receives a new trained model in response to the transmitted request signal (step S012 in FIG. 2). The controller 21 stores the received new trained model in the storage 25 (step S013 in FIG. 2). As a result, the controller 21 can then perform a process at the time of photographing, using the new trained model.

Figure 4A:
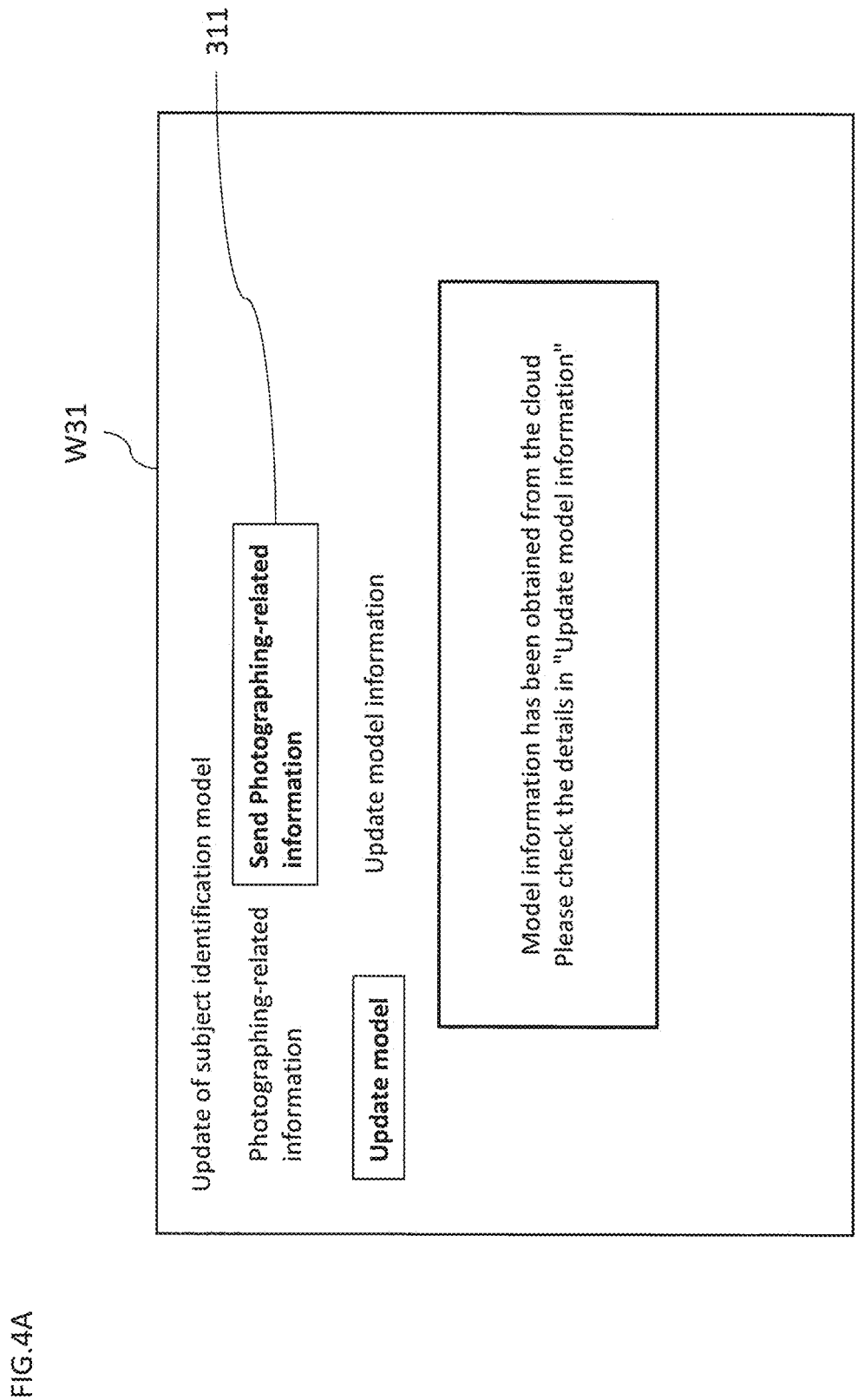
FIG. 4A is an example of an operation screen displayed on a camera that has received a list of new trained models.
Figure 4B:
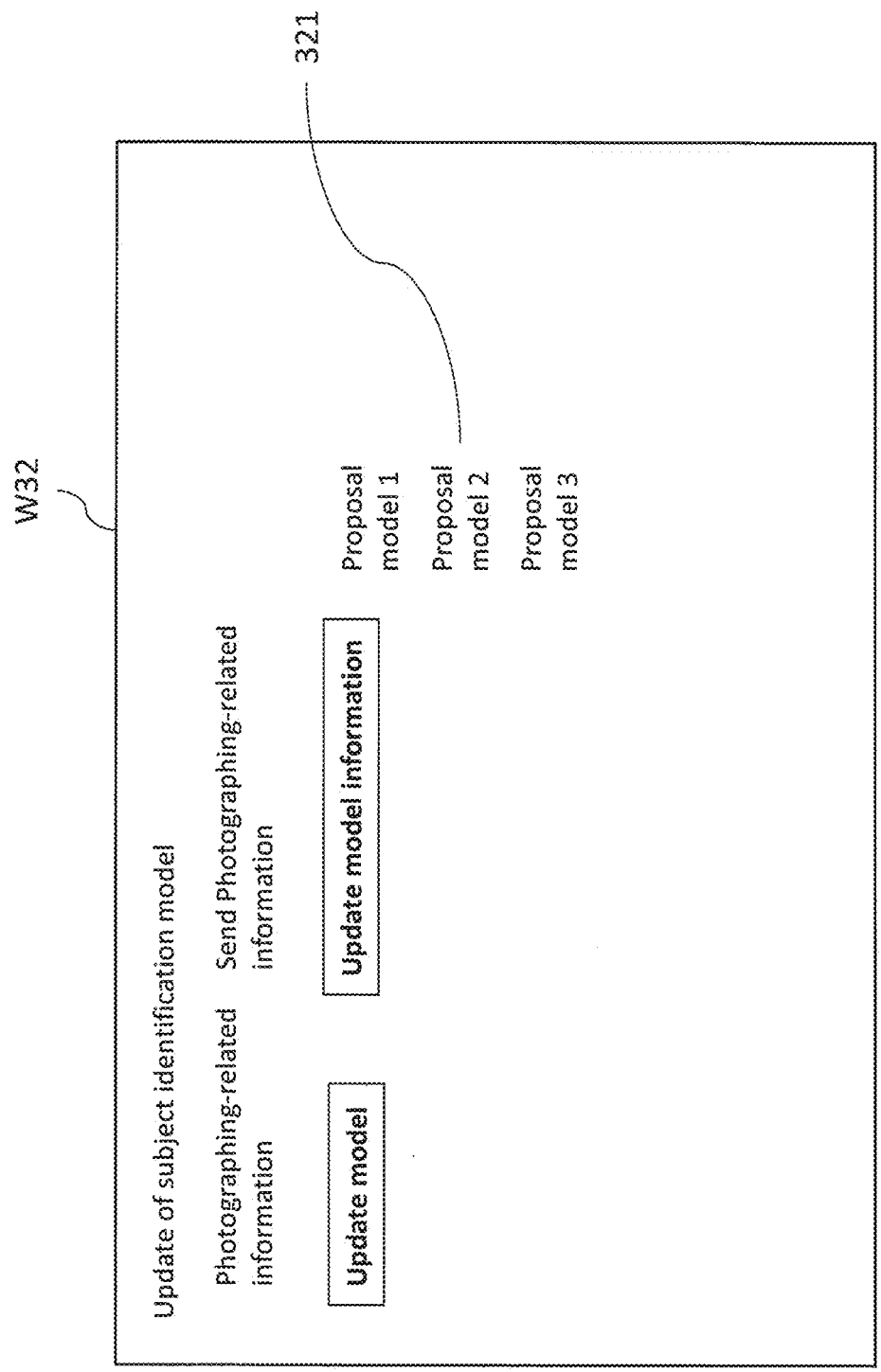
FIG. 4B is an example of an operation screen displayed on the camera subsequent to FIG. 4A.
Figure 4C:
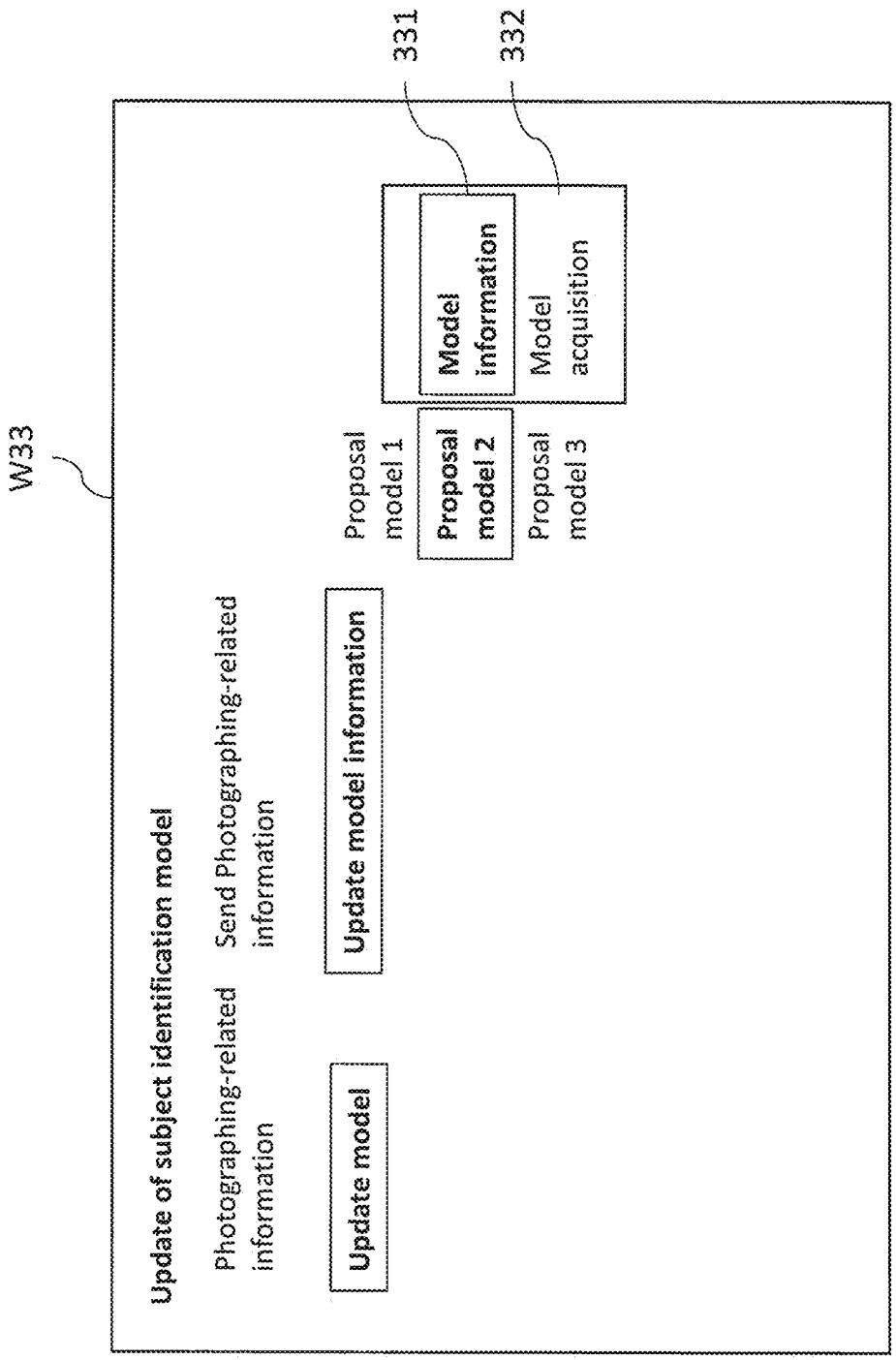
FIG. 4C is an example of an operation screen displayed on the camera subsequent to FIG. 4B.

For example, as illustrated in FIG. 4A, the controller 21 displays, on the output unit 23, an operation screen W31 showing that the recommendation data has been received. The operation screen W31 is an operation screen for notifying that the recommendation data is received after transmission of the photographing-related information to the provision server 10. When "Update model information" 311 is selected on the operation screen W31, the controller 21 switches the operation screen W31 displayed on the output unit 23 to an operation screen W32 illustrated in FIG. 4B. The operation screen W32 is an example in which three trained models of "Proposal model 1", "Proposal model 2", and "Proposal model 3" are proposed. When "Proposal model 2" 321 is selected on the operation screen W32, the controller 21 switches the operation screen W32 displayed on the output unit 23 to an operation screen W33 illustrated in FIG. 4C.

The operation screen W33 includes "Model information" used for operation to display the detailed information of the model and "Model acquisition" used for operation to acquire a model. When "Model information" 331 is selected from the operation screen in FIG. 4C, the controller 21 switches the display from the operation screen W33 displayed on the output unit 23 to an operation screen W34 illustrated as an example in FIG. 4D. The operation screen W34 includes the detailed information of the trained model recommended by the recommendation data. For example, in addition to the photographing target and the photographing condition, it is possible to include a creator of the trained model, version information of the trained model, a comment of the creator, an example of images used as training data, and the like. After confirming the detailed information of the trained model on the operation screen W34, the user can switch the display to the operation screen W33 by operating the input unit 22.

Figure 4E:
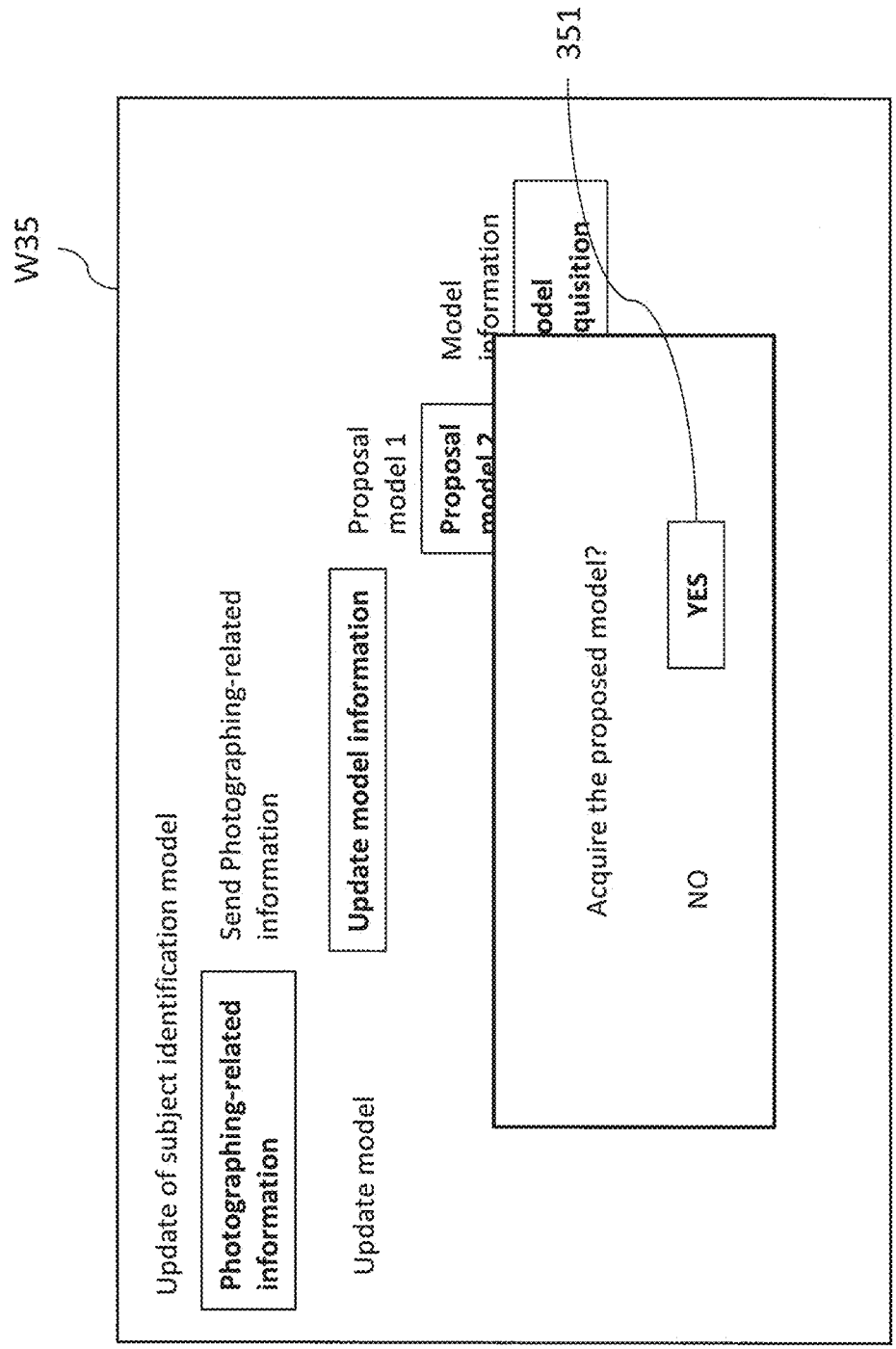
FIG. 4E is an example of an operation screen displayed on the camera subsequent to FIG. 4D.
Figure 4F:
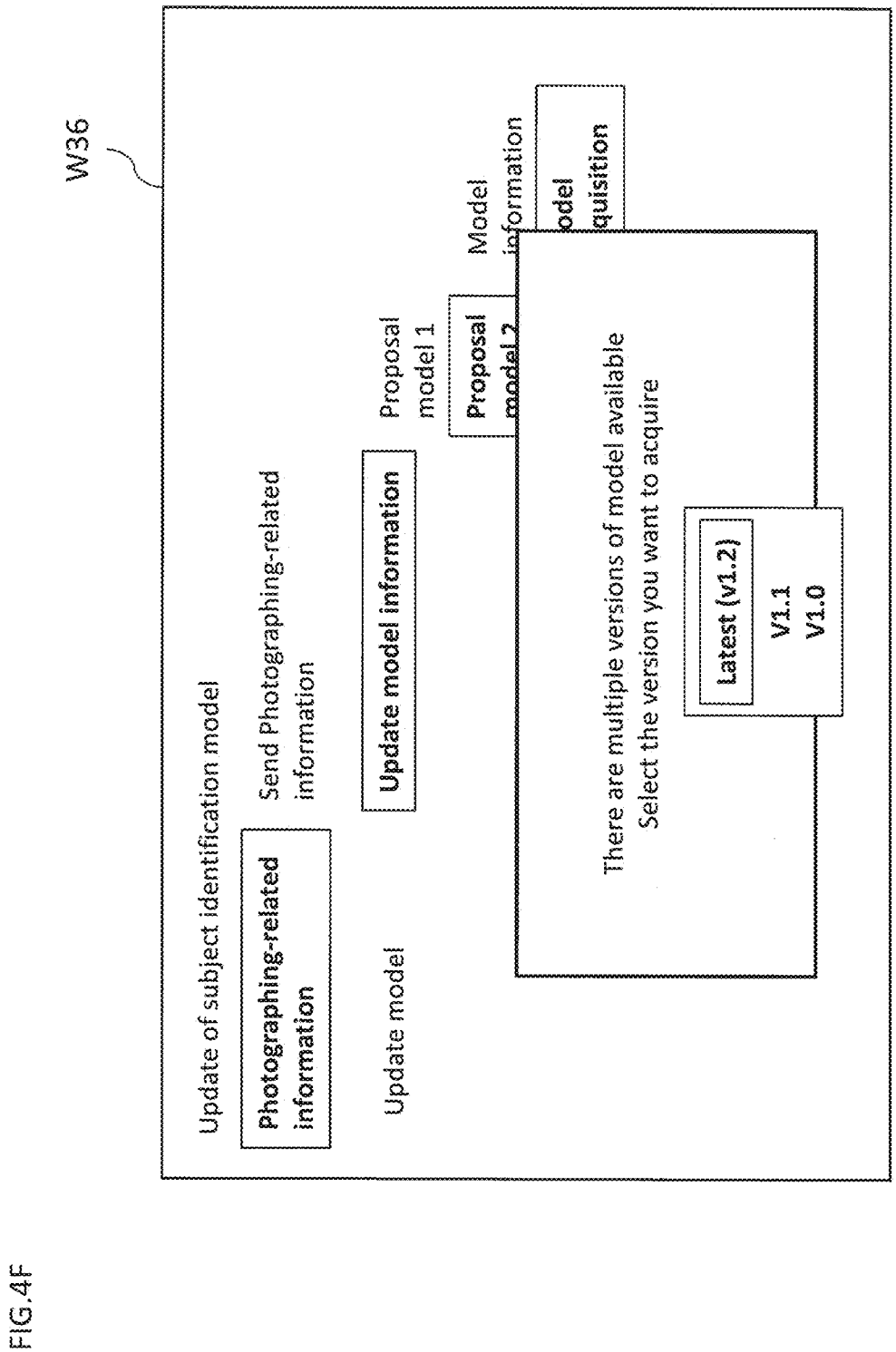
FIG. 4F is an example of an operation screen displayed on the camera subsequent to FIG. 4E.
Figure 4G:
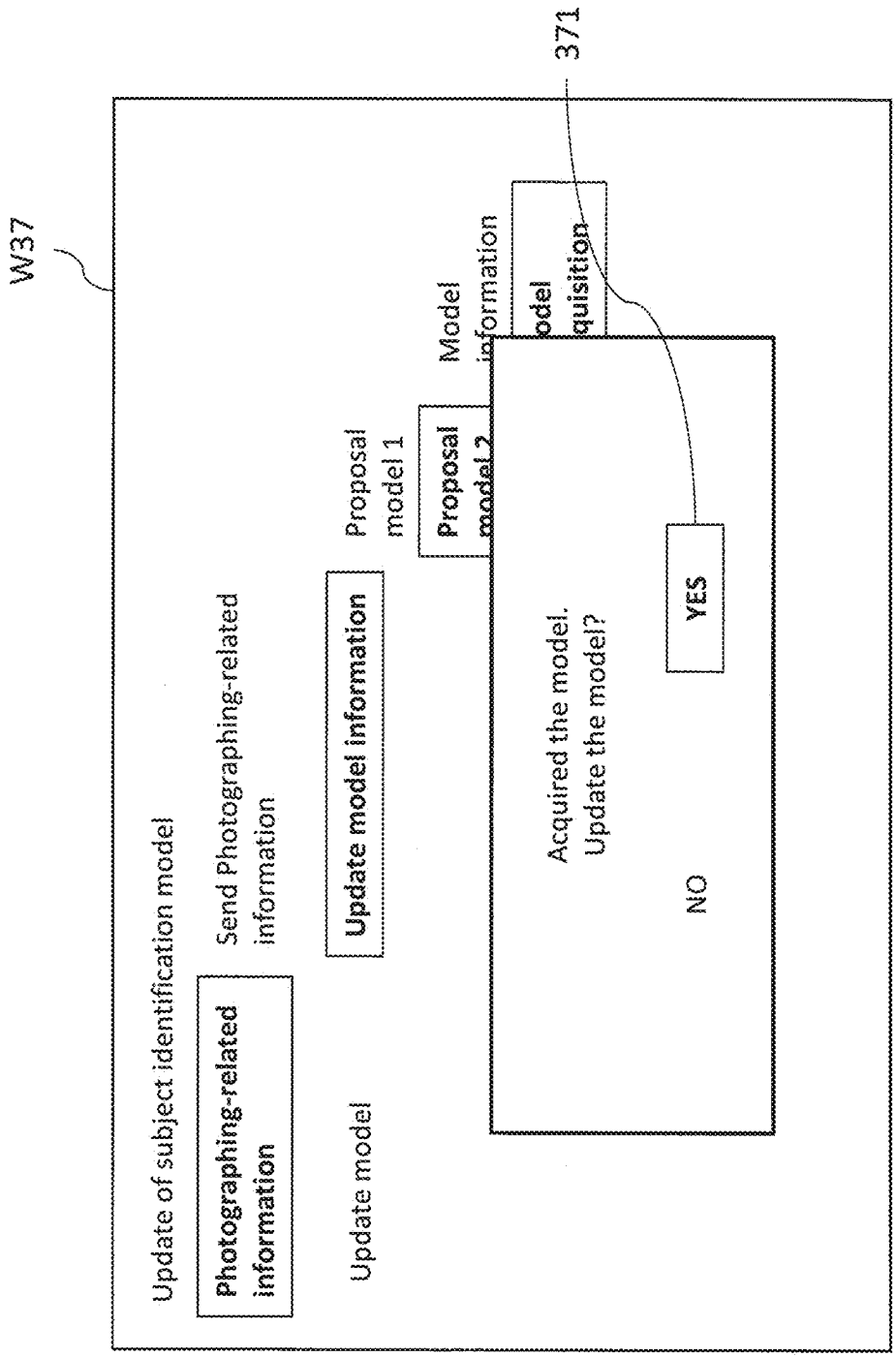
FIG. 4G is an example of an operation screen displayed on the camera subsequent to FIG. 4F.

When "Model acquisition" 332 is selected from the operation screen W33, the controller 21 switches the display from the operation screen W33 displayed on the output unit 23 to an operation screen W35 illustrated as an example in FIG. 4E. When "Yes" 351 is selected from the operation screen W35, the controller 21 transmits to the provision server 10 a request signal to request transmission of the trained model. Regarding the selected trained model, if a plurality of versions of trained models are stored in the provision server 10, it may be selected which version to use. FIG. 4F illustrates an example of an operation screen W36 on which it is selected which version of the trained model to acquire. When reception of the trained model is completed, the controller 21 may perform confirmation of update by causing the output unit 23 to display, for example, an operation screen as illustrated in FIG. 4G.

3. Advantageous Effects

As described above, the provision server 10 according to the first embodiment can select and recommend a trained model on the basis of the photographing-related information including the tendency of photographing by the camera 20. Furthermore, the camera 20 can acquire a new trained model on the basis of the photographing-related information. Therefore, the camera 20 can acquire a new trained model at the following timing: when the tendency of photographing has changed; or when the new trained model has been added to the storage 15. As a result, the camera 20 can capture an image using a more suitable trained model.

Second Embodiment

Figure 5:
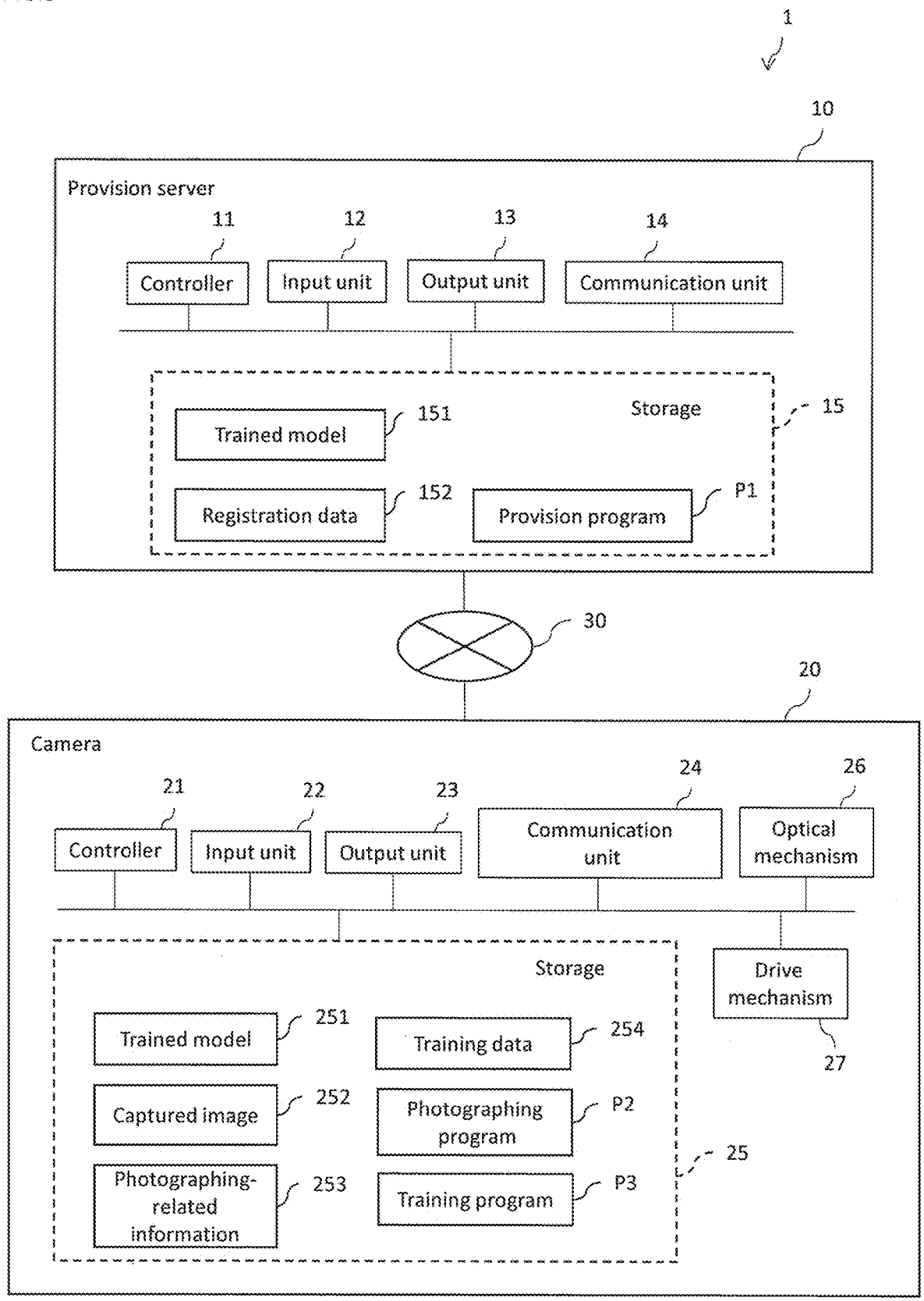
FIG. 5 is a block diagram illustrating a configuration of a provision system according to a second embodiment.

FIG. 5 is a block diagram illustrating a configuration of a provision system 1A according to a second embodiment. The camera 20 of the provision system 1 according to the first embodiment described above uses the trained model provided from the provision server 10. In contrast, a camera 20 of the provision system 1A according to the second embodiment retrains the trained model in the camera 20. Furthermore, the camera 20 provides a provision server 10 with the trained model having been retrained.

1. Configuration

The provision system 1A according to the second embodiment is different from the provision system 1 described above with reference to FIG. 1 in that a storage 25 of the camera 20 stores a training program P3 used to retrain a trained model 251. The other configurations of the provision system 1A are similar to those of the provision system 1.

2. Operation 2-1. Operation of Provision System

Figure 6A:
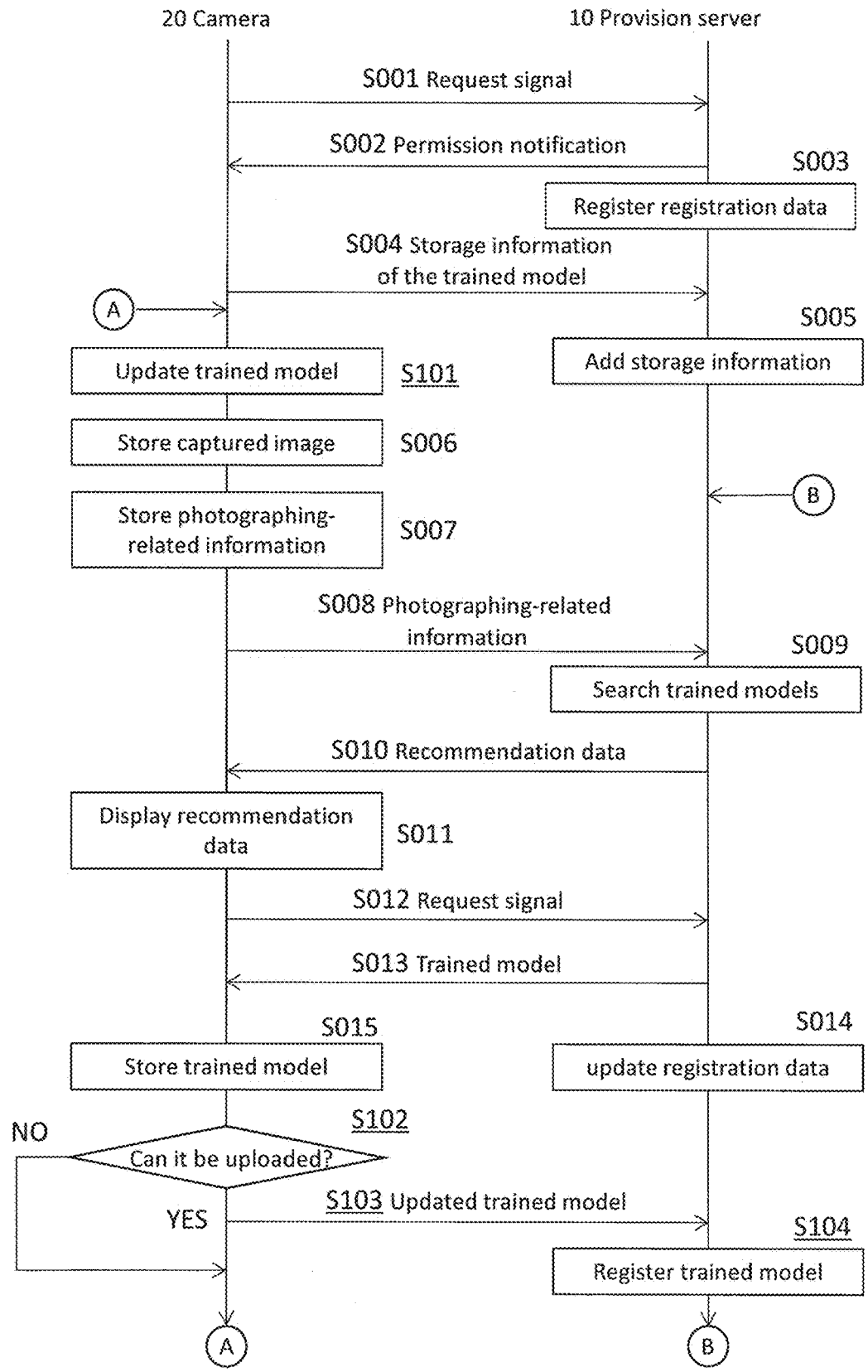
FIG. 6A is a sequence diagram illustrating transmission and reception of data between a provision server and a camera according to the second embodiment.

The overall process of the provision system 1A according to the second embodiment will be described with reference to a sequence diagram illustrated in FIG. 6A. In the sequence diagram illustrated in FIG. 6A, the same processes as those in FIG. 2 are denoted by the same reference signs, and the reference sings of different processes are underlined.

The camera 20 transmits to the provision server 10 a request signal for registration of the camera 20 in a service with which the camera 20 can receive provision of a trained model (step S001).

When the registration in the service is permitted, the provision server 10 transmits a permission notification to the camera 20 (step S002). The provision server 10 further registers user information included in the received request signal, in the registration data 152 (step S003).

Upon receiving the permission notification, the camera 20 generates storage information of the trained model stored in the storage 25 and transmits the storage information to the provision server 10 (step S004).

Furthermore, the camera 20 updates the trained model 251 stored in the storage 25 by retraining (step S101).

The provision server 10 adds the received storage information to the registration data 152 (step S005).

When an image is captured, the camera 20 stores a captured image 252 in the storage 25 (step S006). In addition, the camera 20 stores the photographing-related information 253 in the storage 25 in association with the captured image 252 (step S007).

The camera 20 transmits the photographing-related information to the provision server 10 at a predetermined timing (step S008).

The provision server 10 searches for trained models suitable for the photographing-related information (step S009). In addition, the provision server 10 transmits to the camera 20 recommendation data including a list of retrieved trained models (step S010).

The camera 20 displays the received recommendation data on the output unit 23 (step S011). In addition, when a trained model included in the recommendation data is selected, the camera 20 transmits to the provision server 10 a request signal to request transmission of the trained model (step S012).

The provision server 10 transmits the requested trained model to the camera 20 (step S013). In addition, the provision server 10 updates, in the registration data 152, the information of the trained model used by the camera 20 with the information of the transmitted trained model (step S014).

The camera 20 stores the received trained model in the storage 25 (step S015).

The camera 20 receives whether or not the trained model 251 updated in step S101 can be uploaded to the provision server 10 (step S102).

When the uploading is possible (step S102: YES), the camera 20 transmits the trained model 251 updated in step S101 to the provision server 10 (step S103).

Furthermore, the provision server 10 registers a trained model 251 transmitted from the camera 20 in step S103, in the storage 15 (step S104).

When the uploading is not possible (step S102: NO) or when the trained model 251 updated in step S103 has been transmitted to the provision server 10, the camera 20 returns to step S101 and repeats the processing in step S101 and the following steps.

When the update of the registration data in step S014 or the process of registration of the trained model in step S104 is completed, the provision server 10 returns to step S009 and repeats the processes in step S009 and the following steps.

2-2. Operation of Camera

The controller 21 performs processes of generation of training data, retraining, and provision of a trained model. Hereinafter, each process performed in the controller 21 will be described. Each process is performed when an operation screen is displayed on the output unit 23, which is a display, and the user inputs an operation via the input unit 22 in accordance with the operation screen. In the following description, the description will be given using an example of an operation screen displayed on the output unit 23 as necessary.

(Overall Process)

With reference to the flowcharts illustrated in FIGS. 6B to 6F, the processes from accumulation of images in the camera to provision of a trained model.

Figure 6B:
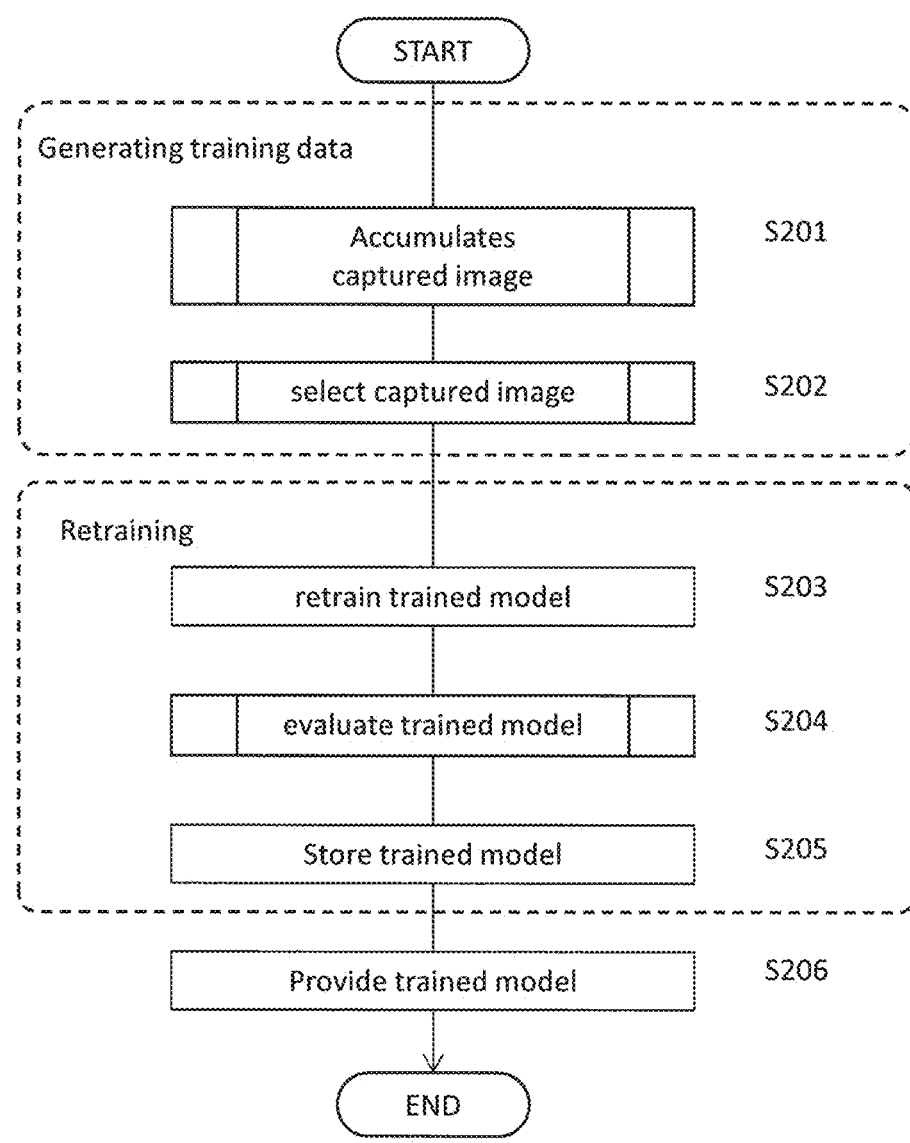
FIG. 6B is a flowchart illustrating an example of a process performed by the camera according to the second embodiment.

As illustrated in FIG. 6B, when an image is captured, the controller 21 accumulates a captured image 252 in the storage 25 (step S201). The process of the accumulation of the captured image 252 will be described later with reference to the flowchart of FIG. 6C.

The controller 21 selects a captured image 252 from a plurality of images accumulated in storage 25 in step S201 (step S202). Furthermore, the captured image 252 selected serves as training data 254. The process of the selection of the captured image 252 will be described later with reference to the flowcharts of FIGS. 6D and 6E. For example, the process of steps S201 to S202 is deemed as a process of the generation of training data.

The controller 21 performs retraining of the trained model 251, using the captured image obtained by the selection in step S202 (step S203).

The controller 21 evaluates a new trained model 251 obtained by the retraining in step S203 (step S204). The process of the evaluation of the new trained model 251 will be described later with reference to the flowchart of FIG. 6F.

The controller 21 stores the new trained model 251 evaluated in step S204 in the storage 25 (step S205). As a result, the trained model 251 in the storage 25 is updated. For example, the process of steps S203 to S205 is deemed as the process of retraining.

The controller 21 transmits the new trained model 251 updated in step S205 to the provision server 10 (step S206). Thus, the controller 21 can provide the new trained model 251 to the provision server 10. The new trained model 251 transmitted here is stored in the storage 15 of the provision server 10. Thereafter, the provision server 10 can provide the new trained model 251 to another device that needs the new trained model 251.

(Generation of Training Data)

The controller 21 accumulates the captured images and generates training data using the captured image selected from the plurality of captured images.

Figure 6C:
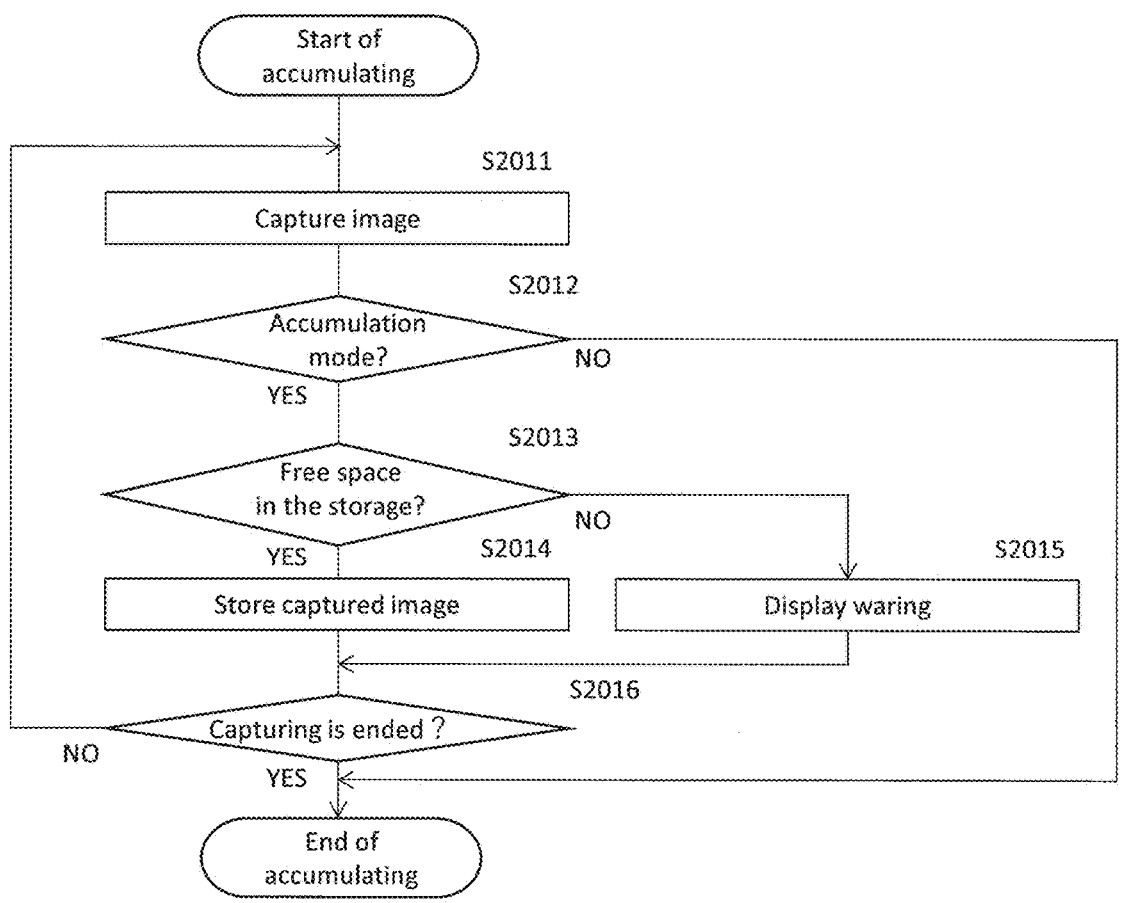
FIG. 6C is a flowchart illustrating an example of an accumulation process of a captured image performed by the camera according to the second embodiment.

The process of the accumulation of captured images in step S201 will be described with reference to the flowchart of FIG. 6C. In the camera, when an image is captured (step S2011), as long as the mode is an accumulation mode (step S2012: YES) and there is a free space in the storage 25 (step S2013: YES), the controller 21 stores the captured image 252 in the storage 25 (step S2014).

If there is no free space in the storage 25 (step S2013: NO), the controller 21 displays a warning on the output unit 23 (step S2015).

The process in steps S2011 to S2015 is continued until the image capturing is ended (step S2016: YES).

Note that, in a case where the mode is not the accumulation mode (step S2012: NO), it is not necessary to accumulate an image, and the processing is therefore ended. The case of not being in the accumulation mode is, for example, a timing when an image is previewed.

When generating the training data 254, the controller 21 may select only the captured image 252 suitable for training. The controller 21 can use a sorting program stored in advance in the storage 25 to sort out the captured images 252. Furthermore, the controller 21 may display each captured image 252 on the output unit 23, which is a display, and receive user's selection. Note that both the sorting program and the selection by the user may be used. For example, the controller 21 can generate the training data 254 by associating the selected captured images 252 with the photographing-related information 253.

Figure 6D:
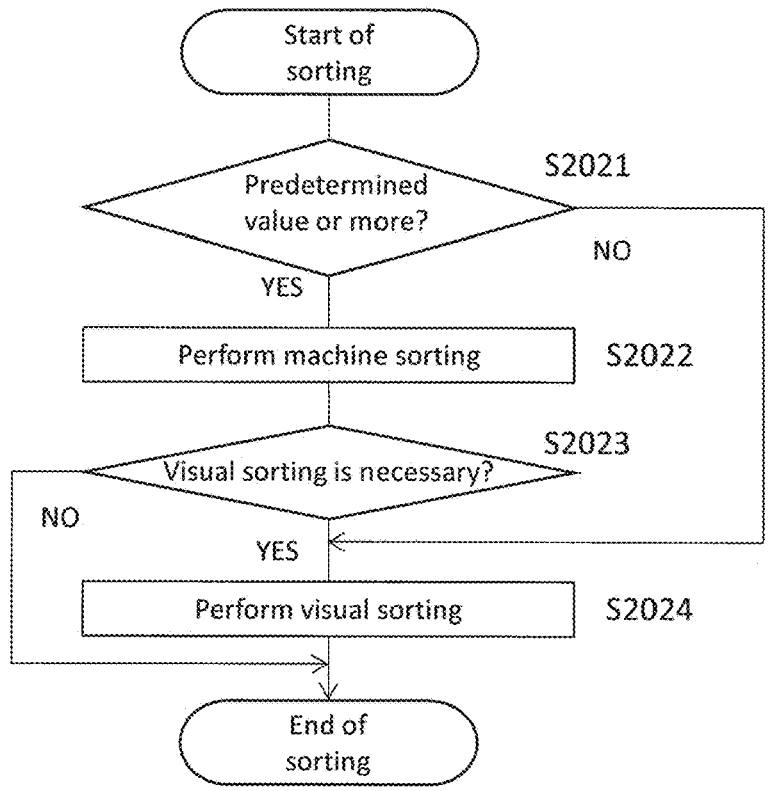
FIG. 6D is a flowchart illustrating an example of a sorting process of captured images performed by the camera of the second embodiment.

The process of sorting out the captured images in step S202 will be described with reference to the flowchart of FIG. 6D. Two examples of the process of sorting out images are proposed. The flowchart of FIG. 6D is a first example of the two.

When the number of the captured images accumulated in the storage 25 is a predetermined value or more (step S2021: YES), the controller 21 performs a process of machine sorting (step S2022). The machine sorting is a process for sorting out using the sorting program stored in advance in the storage 25.

When the machine sorting is completed, the controller 21 determines whether the visual sorting by the user is necessary (step S2023). The case where the visual sorting is necessary is, for example, the case where the controller 11 tests the training data, thereby revealing that the reliability is low; and in that case, the visual sorting is determined to be necessary. Note that the controller 21 may display the reliability on the output unit 23 and cause the user to select the visual sorting.

When the visual sorting is necessary (step S2023: YES), a target captured image 252 is displayed on the output unit 23, and after the process of the visual sorting by the user is performed, a series of processes of the sorting of the captured images is terminated (step S2024). On the other hand, when the visual sorting is not necessary (step S2023: NO), a series of processes of the sorting of the captured images is terminated.

Figure 6E:
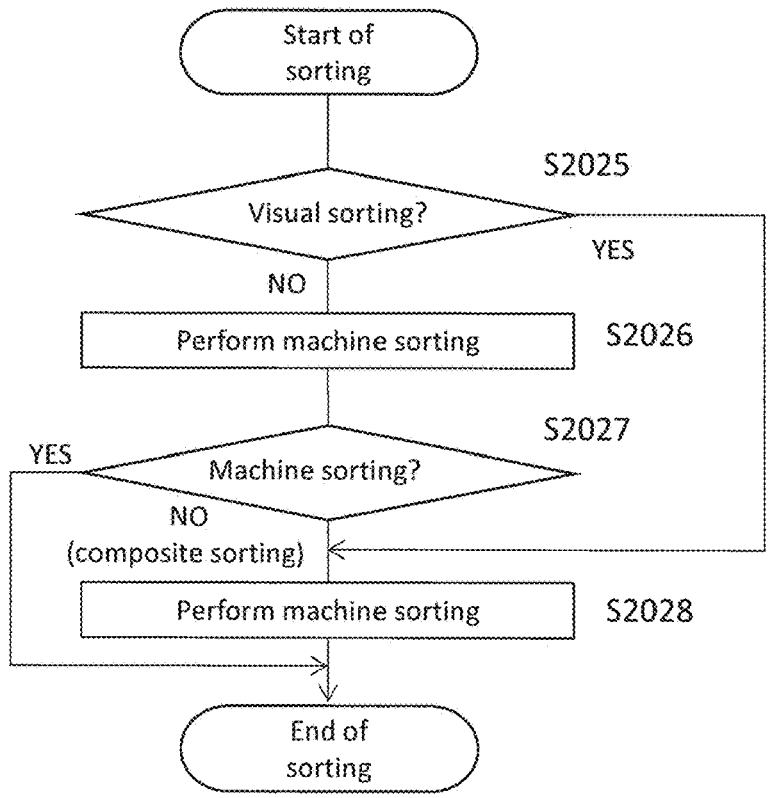
FIG. 6E is a flowchart illustrating another example of the sorting process of captured images performed by the camera according to the second embodiment.

A second example of the process of sorting out the captured images in step S202 will be described with reference to the flowchart of FIG. 6E.

It is determined whether the captured images accumulated in the storage 25 are objects of the visual sorting (step S2025). The case where the captured images are not the objects of the visual sorting is the case where the mode is set to a "machine sorting mode" or set to a "composite sorting mode" in which both the machine sorting and the visual sorting are used.

When the mode is not for the visual sorting (step S2025: NO), the controller 21 performs the process of the machine sorting (step S2026).

When the machine sorting is completed, the controller 21 determines whether the accumulated captured images are objects of the machine sorting (step S2027). When the accumulated captured images are the objects of the machine sorting (step S2027: YES), since the sorting is completed, a series of processes of the sorting of the captured images is ended.

On the other hand, when the accumulated captured images are not the objects of the machine sorting (step S2027: NO), the accumulated captured images are objects of the composite sorting in which both the machine sorting and the visual sorting are performed. When the accumulated captured images are the objects of the visual sorting (step S2025: YES) or the objects of the composite sorting (step S2027: NO), the process of the visual sorting is performed (step S2028).

(Retraining)

Figure 7A:
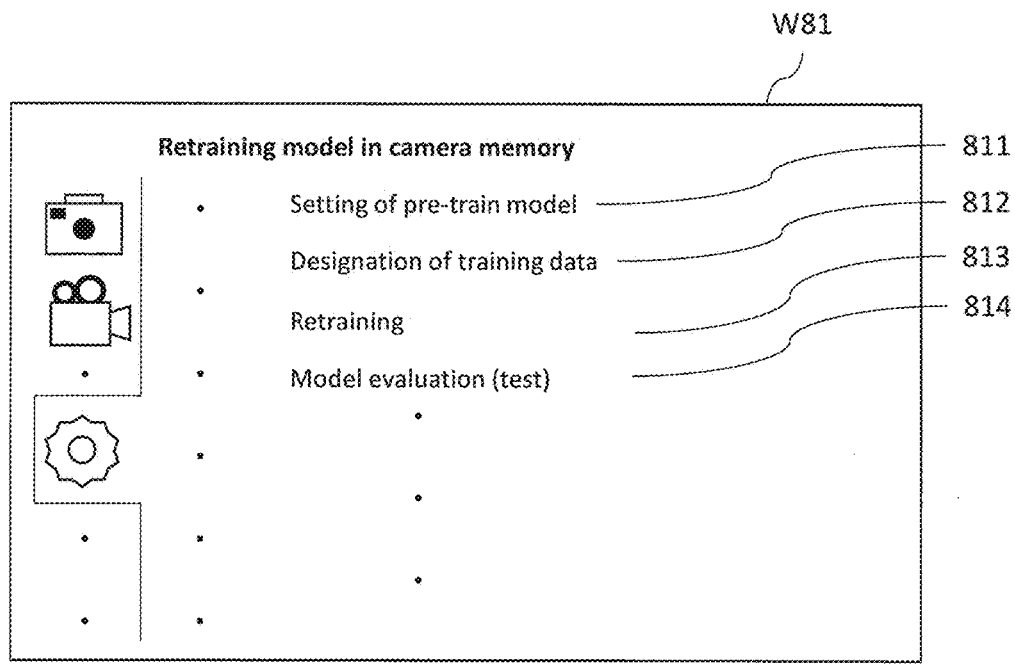
FIG. 7A is an example of an operation screen displayed on a camera for which retraining of a trained model is desired.
Figure 7B:
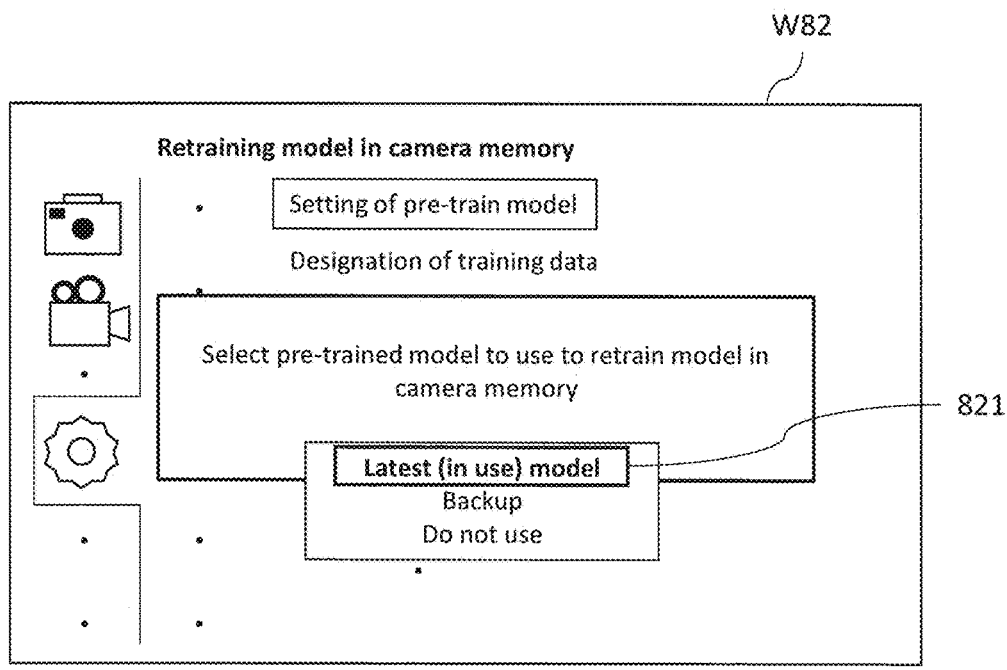
FIG. 7B is an example of an operation screen displayed on the camera subsequent to FIG. 7A.

An operation on the operation screen illustrated in FIG. 7A enables retraining. When "Setting of pre-train model" 811 is selected on the operation screen W81, the controller 21 displays an operation screen W82 illustrated as an example in FIG. 7B on the output unit 23. The operation screen W82 is an operation screen used to designate a pre-train model. For example, when "Latest (in use) model" 821 is selected on the operation screen W82, the controller 21 performs retraining, using the currently available trained model 251 as the pre-train model.

Figure 7C:
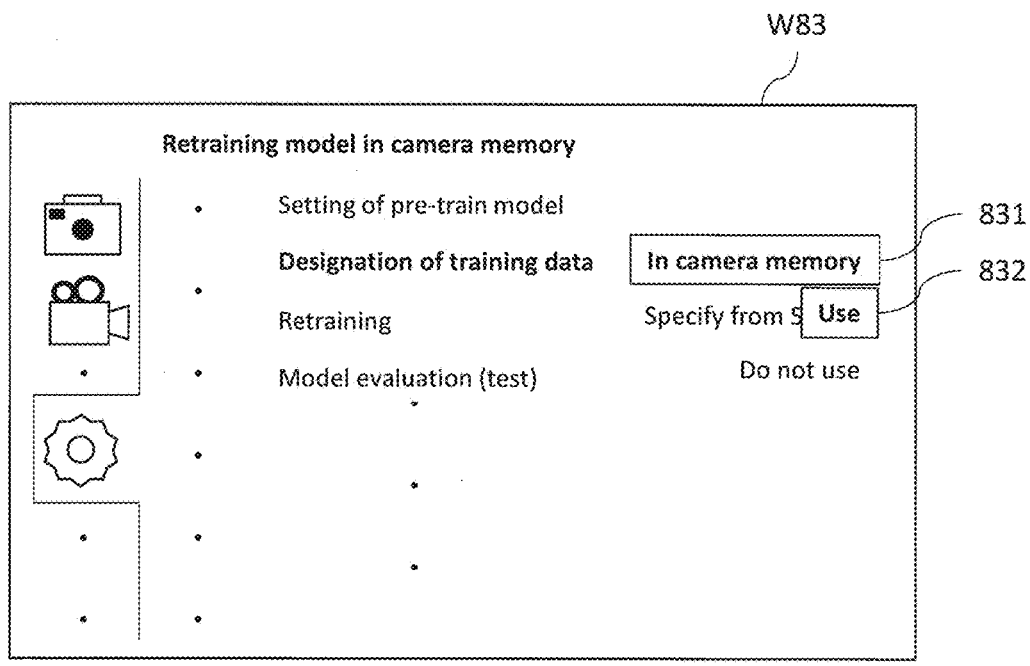
FIG. 7C is an example of an operation screen displayed on the camera subsequent to FIG. 7B.
Figure 7D:
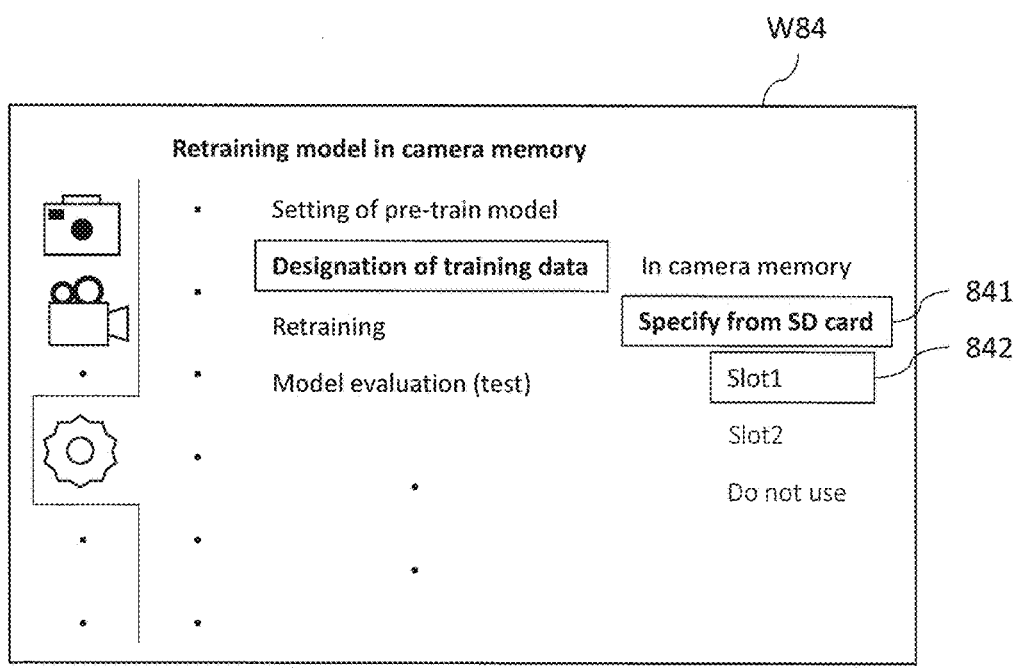
FIG. 7D is an example of an operation screen displayed on the camera subsequent to FIG. 7C.

When "Designation of training data" 812 is selected on the operation screen W81, the controller 21 displays an operation screen as illustrated in FIG. 7C or 7D. When, for example, "In-camera memory" 831 is selected, as the "designation of training data" from the operation screen W83 in FIG. 7C and "Use" 832 is selected, the controller 21 performs retraining, using the data stored in an in-camera memory. Furthermore, when, for example, "Specify from SD card" 841 is selected and "Slot1" 842 is selected from the operation screen W84 in FIG. 7D, the controller 21 performs retraining, using data stored in the SD card inserted in the slot1.

When "Retraining" 813 is selected from the operation screen W81 after the pre-train model and the training data are designated, the controller 21 performs retraining. While training is being performed, the controller 21 may display a message such as "Training in progress". Furthermore, the controller 21 may display a message such as "Training is completed" when the training is completed.

Figure 7E:
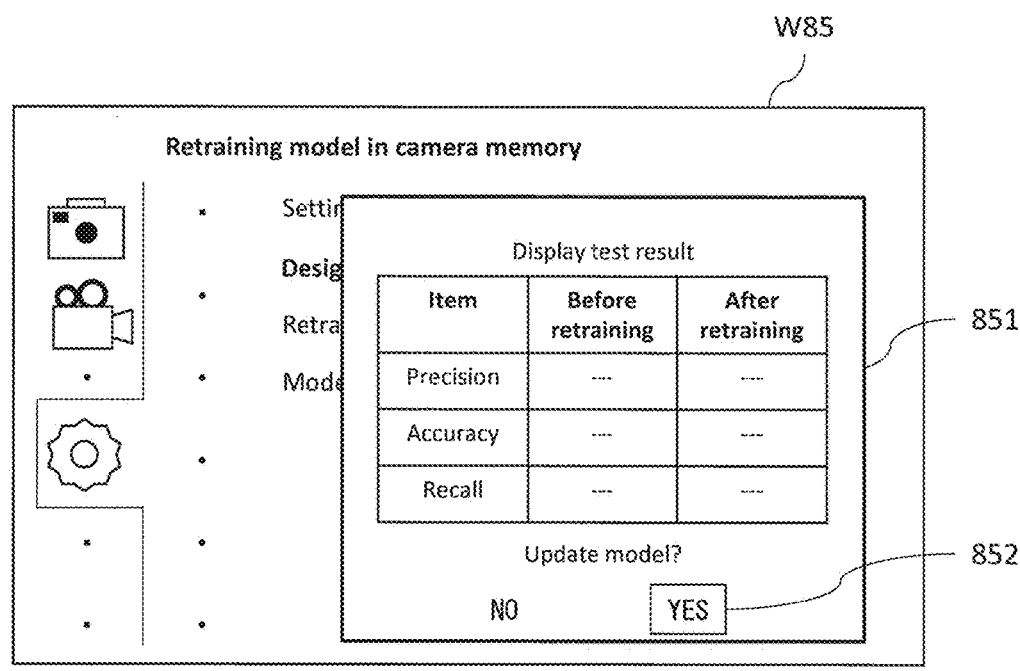
FIG. 7E is an example of an operation screen displayed on the camera subsequent to FIG. 7D.

When "Model evaluation" 814 is selected from the operation screen W81 after the training is completed, the controller 21 performs a model evaluation process. The controller 21 may display a message such as "Test in progress" while the evaluation is being performed. In addition, the controller 21 displays, for example, an operation screen W85, illustrated in FIG. 7E, including an evaluation result 851 when the model evaluation process is completed. When "Yes" 852 is selected on the operation screen, the trained model is updated to a new trained model.

Figure 6F:
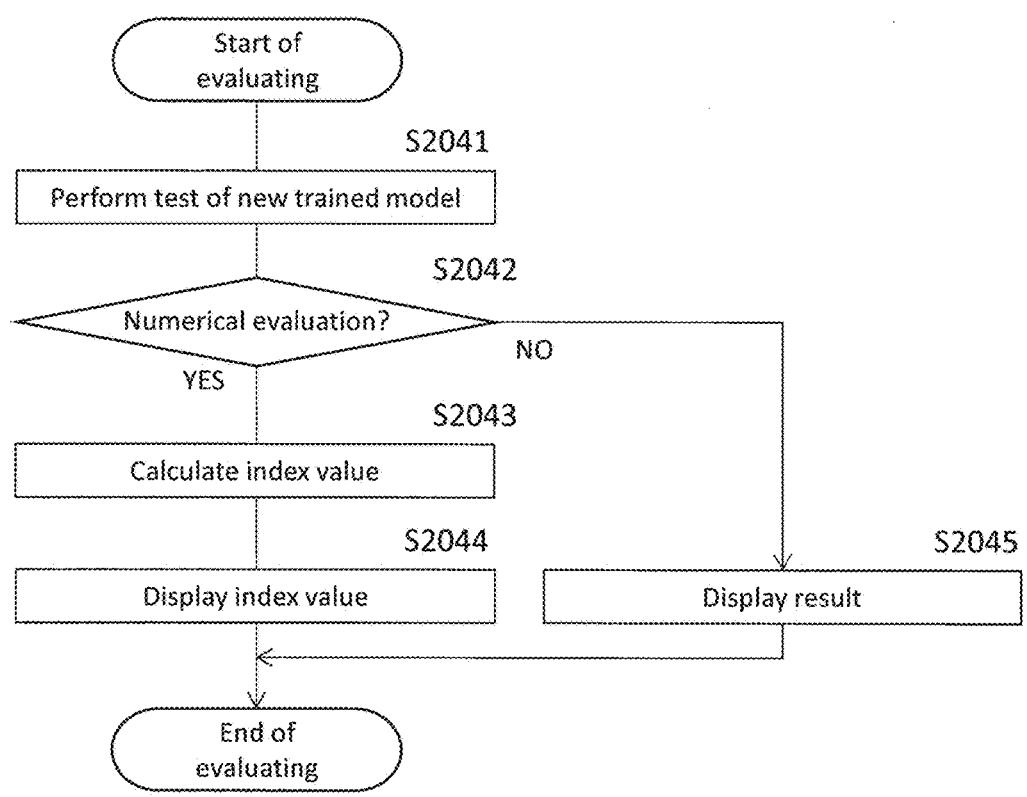
FIG. 6F is a flowchart illustrating an example of an evaluation process of a captured image performed by the camera according to the second embodiment.

The model evaluation process on the trained model in step S204 will be described with reference to the flowchart of FIG. 6F. The controller 21 performs a test of the new trained model obtained in step S203 (step S2041).

The controller 21 determines whether to perform a numerical evaluation (step S2042).

When the numerical evaluation is performed (step S2042: YES), the controller 21 calculates an index value of the evaluation (step S2043). For example, the controller 21 may calculate a precision, an accuracy, a recall, or the like as the index value. In addition, the controller 21 displays the index value calculated in step S2043 on the output unit 23 (step S2044). As a result, the user can quantitatively check the test result on the basis of a numerical value.

On the other hand, when the numerical evaluation is not performed (step S2042: NO), the controller 21 displays the test result on the output unit 23 (step S2045). As a result, the user can visually check the test result.

(Provision of Trained Model)

Figure 8A:
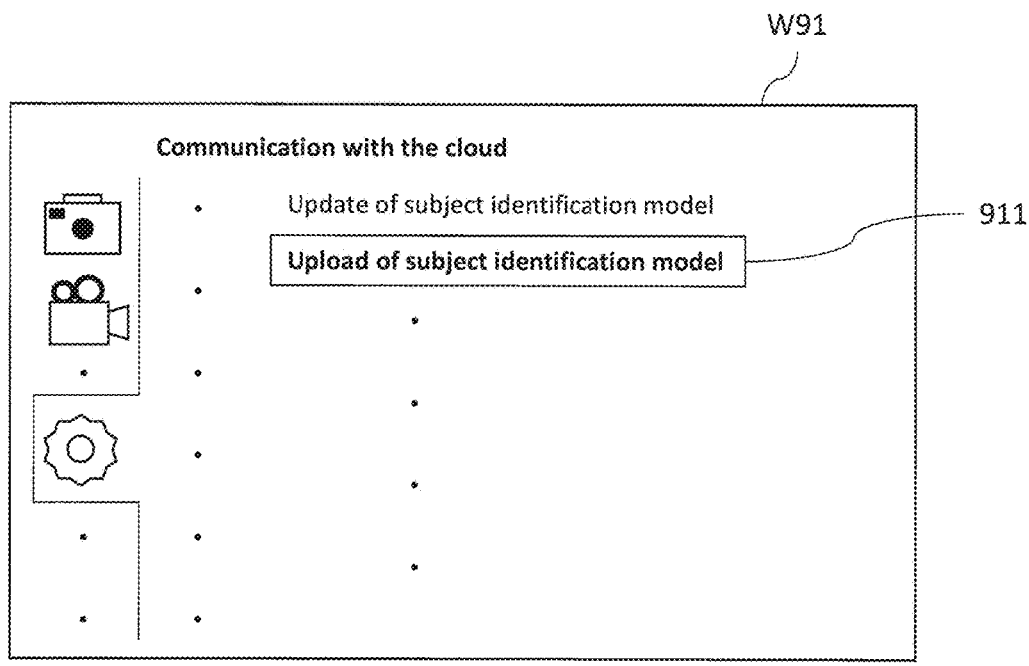
FIG. 8A is an example of an operation screen displayed on a camera for which provision of a new trained model is desired.
Figure 8B:
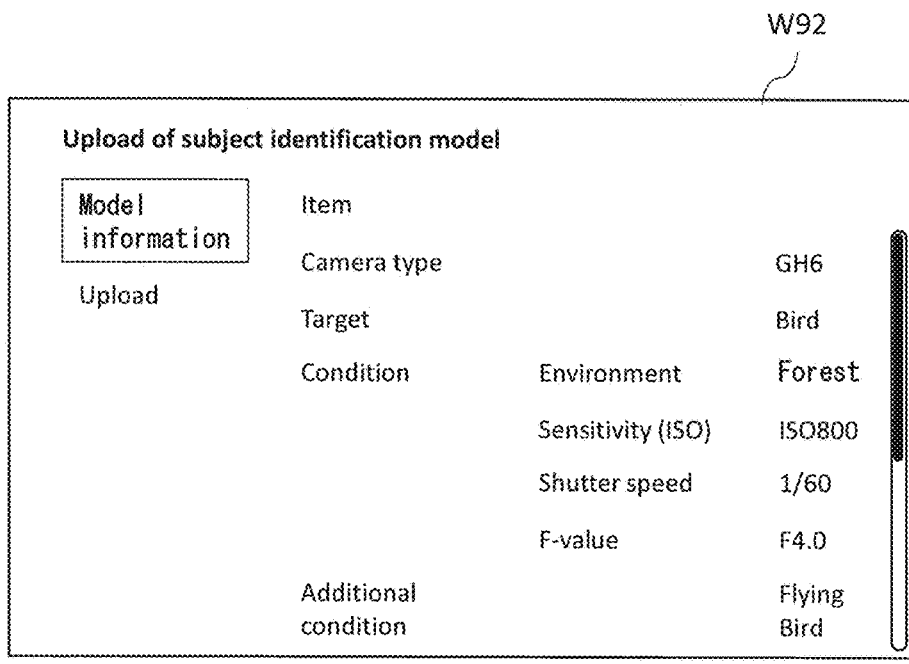
FIG. 8B is an example of an operation screen displayed on the camera subsequent to FIG. 8A.

An operation on an operation screen W91 illustrated in FIG. 8A enables provision of the new trained model to the provision server 10. When "Update of subject identification model" 911 is selected on the operation screen W91, the controller 21 can display, on the output unit 23, an operation screen W92 on which information regarding the trained model as illustrated in FIG. 8B can be input, for example. For example, the user may change any of the items illustrated in FIG. 8B to a more easy-to-understand content. Furthermore, the user may register a comment for the new trained model.

Figure 8C:
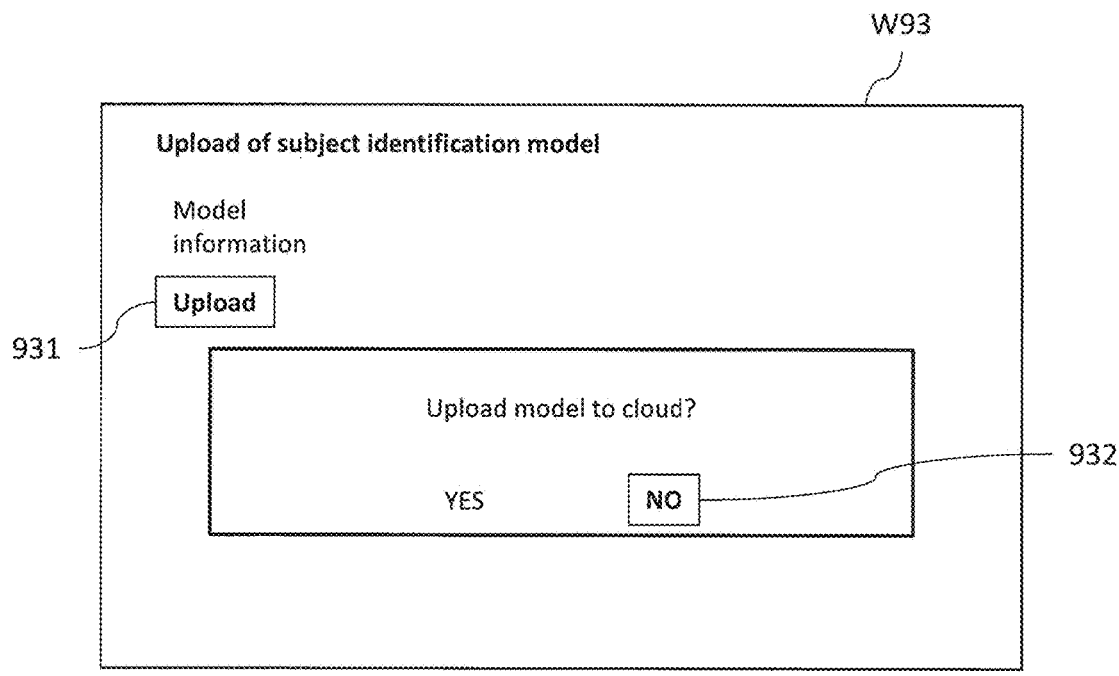
FIG. 8C is an example of an operation screen displayed on the camera subsequent to FIG. 8B.

After that, as illustrated in FIG. 8C, when "Upload" 931 is selected on an operation screen W93 and "Yes" 932 is selected in response to a question "Upload model to cloud?", the controller 21 transmits the new trained model to the provision server 10. The controller 21 may display a message such as "Upload in progress" while the transmission of the trained model is being performed. Furthermore, when the transmission of the trained model is completed, the controller 21 may display a message such as "Upload is completed".

Note that, in the above example, the description has been given using an example in which the controller 21 performs retraining, using the training data 254 including the captured image 252. However, there can be a trained model 251 that does not require the captured image 252. In retraining of such a trained model 251, only the photographing-related information 253 can be set as the training data 254.

3. Advantageous Effects

As described above, the camera 20 according to the second embodiment performs retraining, using the captured image and/or the photographing-related information 253 in the storage 25. As a result, the camera 20 can generate a new trained model 251 optimal for imaging by the camera 20. Furthermore, the camera 20 can provide the generated new trained model 251 to the provision server 10. Therefore, the provision server 10 can provide the new trained model 251 received from the camera 20 to another camera and the like.

If a system in which a wide variety of trained models are distributed is created, the provision system 1A according to the second embodiment described above is useful. For example, in some cases, a trained model generated by the user's own camera 20 through retraining may be useful for another user who uses another camera. The provision system 1A provides the trained model from the camera 20 to the provision server 10. As a result, the provision server 10 can provide the trained model provided from the camera 20 to another camera in which the trained model is wanted to be used.

Furthermore, for example, in a case where a user purchases a new camera, the trained model generated by an old camera 20 through retraining is not stored in the new camera. Therefore, the user using the new camera cannot use the trained model generated by the old camera 20 through retraining. In a case where the trained model generated by the old camera 20 is registered in the provision server 10, the new camera can receive provision of the trained model generated by the old camera from the provision server 10. In this manner, the distribution of the trained model can be achieved using the provision system 1A.

Other Embodiments

The first and second embodiments have been described in the above as an example of the techniques disclosed in the present application. However, the techniques of the present disclosure can be applied not only to the above embodiments but also to an embodiment in which modification, replacement, addition, or removal is appropriately made. Furthermore, it is possible to form a new embodiment by combining the components described in the above embodiments. Therefore, other embodiments will be exemplified below.

In each of the above embodiments, the camera 20 including the output unit (display unit) 23 has been described, but the camera 20 of the present embodiment does not need to include a display unit. In the present embodiment, the camera 20 may include a connection unit such as an interface circuit that causes an external display monitor to display various types of information, and a box camera or the like may be used, for example. For example, the camera 20 according to the embodiment may include a connection terminal (connection unit) such as an HDMI (registered trademark) terminal or an SDI terminal and may thereby be connected to an external device such as an external monitor. Furthermore, the camera 20 of the present embodiment may include both an interface circuit and a display monitor.

In each of the above embodiments, the camera 20 including the storage 25 such as a flash memory has been described. In the present embodiment, the camera 20 does not need to include the storage 25 inside the camera 20. In the present embodiment, in a case where the camera 20 is configured with a memory card as an external storage, the camera 20 includes a card slot to which the memory card can be attached and detached. The card slot accesses the memory card under the control of the controller 21. The card slot is an example of a connection unit in the camera 20 of the present embodiment. The card slot does not need to be provided. The camera 20 of the present embodiment does not need to record in a memory card, and may include a connection unit such as a slot for recording image data in various recording media such as an SSD. The camera 20 of the present embodiment may include a connection terminal (connection unit) such as a USB terminal to be connected to an external storage device. Furthermore, the camera 20 of the present embodiment may include both the connection unit and the storage 25.

Each of the above embodiments has exemplified the camera 20 including the optical mechanism 26 including optical elements such as a focusing lens, a zooming lens, and an optical image stabilizer (OIS) lens and the drive mechanism 27.

The imaging device of the present embodiment does not need to include the optical mechanism 26 including the above optical elements and the drive mechanism 27, and may be an interchangeable lens type camera, for example. When the camera 20 is an interchangeable lens type camera, the camera 20 can be mechanically and electrically connected to a lens mount of an interchangeable lens via a body mount (not illustrated).

First Modification

1. Configuration

Figure 9:
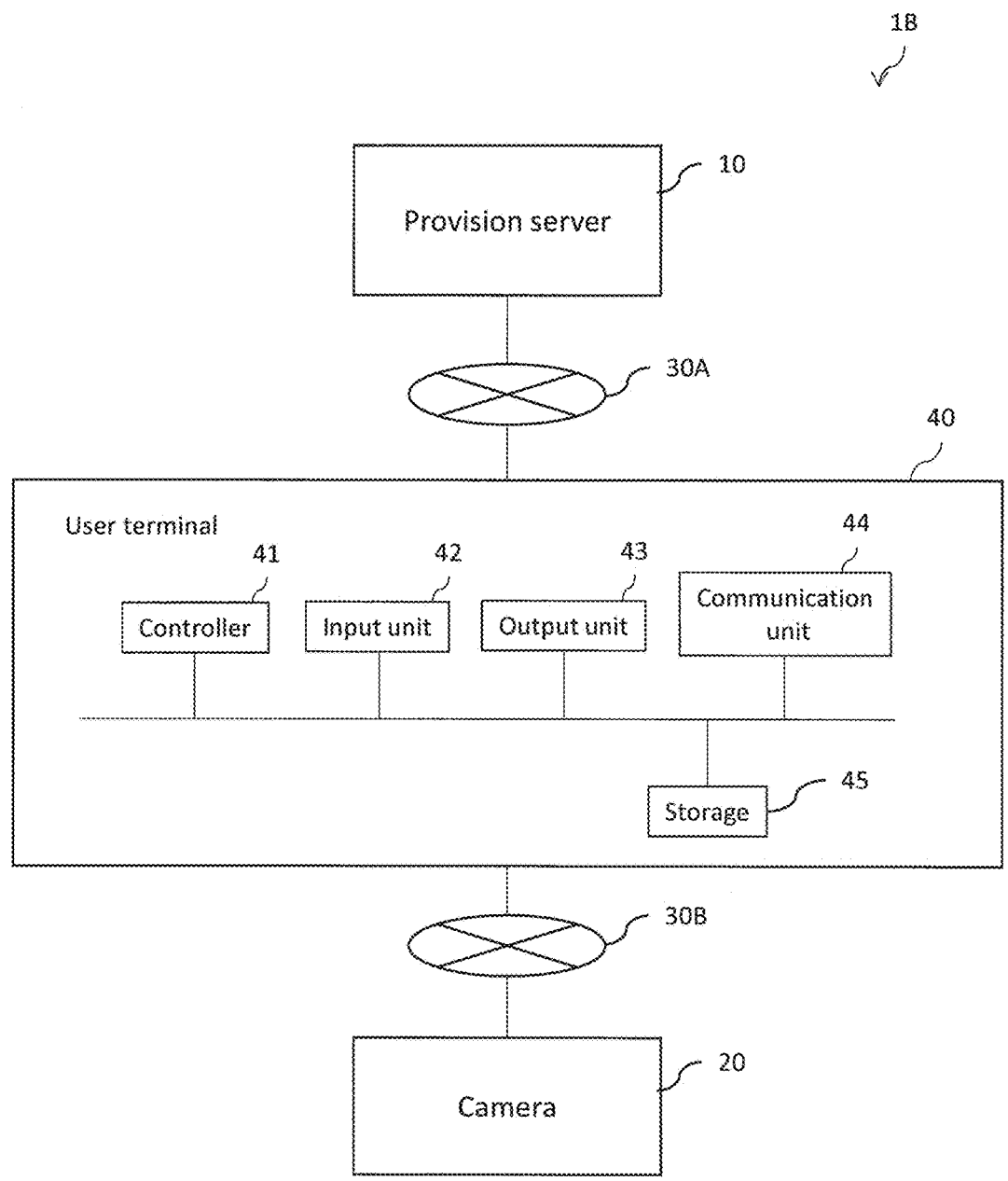
FIG. 9 is a block diagram illustrating a configuration of a provision system according to a first modification.

FIG. 9 is a block diagram illustrating a provision system 1B according to a modification. The provision system 1B is different from the provision system 1 according to the first embodiment described above with reference to FIG. 1 in that the provision system 1B includes a user terminal 40. In the provision system 1, transmission and reception of data is performed between the provision server 10 and the camera 20. In contrast, in the provision system 1B according to the first modification, the camera 20 transmits and receives data to and from the provision server 10 via the user terminal 40.

As illustrated in FIG. 9, the user terminal 40 includes a controller 41, an input unit 42, an output unit 43, a communication unit 44, a storage 45, and the like. The user terminal 40 is an information processing terminal such as a smartphone, a tablet terminal, or a personal computer used by the user. The controller 41, the input unit 42, the output unit 43, the communication unit 44, and the storage 45 are realized by specific means similar to the controller 11, the input unit 12, the output unit 13, the communication unit 14, and the storage 15 of the provision server 10 described above.

2. Operation of Provision System

In the provision system 1B according to the first modification, the user inputs operation signals via the input unit 42 of the user terminal 40. Furthermore, the display screen described with reference to FIGS. 3A to 4G is displayed on the output unit 43, which is a display of the user terminal 40.

Figure 10:
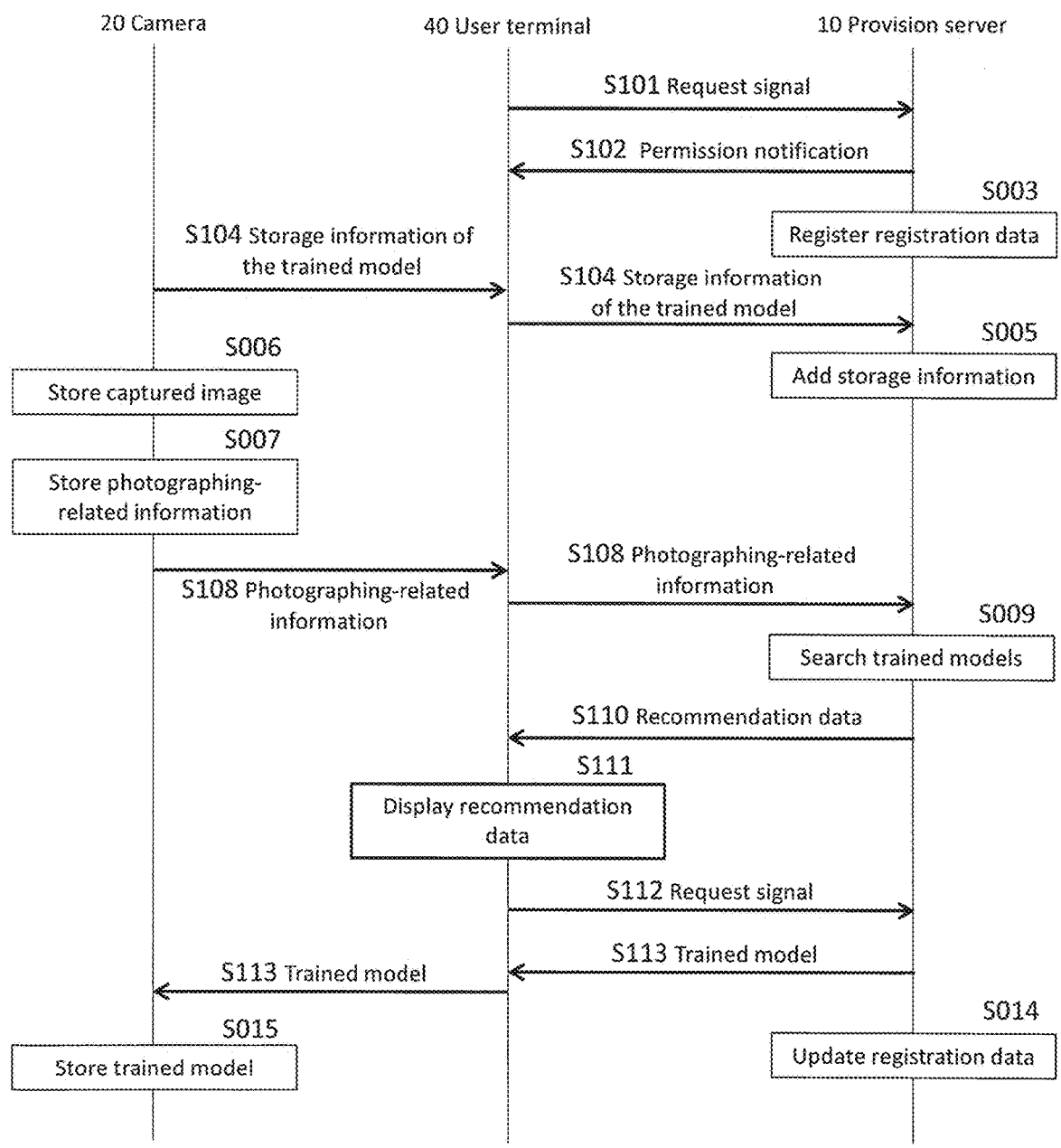
FIG. 10 is a sequence diagram illustrating transmission and reception of data in the provision system according to the first modification.

With reference to the sequence diagram illustrated in FIG. 10, the overall process in the provision system 1B will be described. In each step, the same process as that in FIG. 2 will be described with the same process number assigned.

First, the user terminal 40 used by the user of the camera 20 transmits a request signal for registration in the service to the provision server 10 (step S101).

When the registration in the service is permitted, the provision server 10 transmits a permission notification to the user terminal 40 (step S102). The provision server 10 further registers user information included in the received request signal, in the registration data 152 (step S003).

Upon receiving the permission notification, the user terminal 40 acquires, from the camera 20, storage information of a trained model stored in the storage 25. The user terminal 40 further transmits the storage information of the trained model to the provision server 10 (step S104).

The provision server 10 adds the storage information to the registration data 152 (step S005).

When an image is captured, the camera 20 stores a captured image in the storage 25 (step S006). In addition, the camera 20 stores photographing-related information in the storage 25 in association with the captured image (step S007).

The user terminal 40 acquires the photographing-related information from the camera 20 at a predetermined timing.

In addition, the user terminal 40 transmits the photographing-related information to the provision server 10 (step S108).

The provision server 10 searches for trained models suitable for the photographing-related information (step S009). In addition, the provision server 10 transmits to the user terminal 40 recommendation data including a list of retrieved trained models (step S110).

The user terminal 40 displays the received recommendation data on the output unit 43 (step S111). In addition, when a trained model included in the recommendation data is selected, the user terminal 40 transmits to the provision server 10 a request signal to request transmission of the trained model (step S112).

The provision server 10 transmits the trained model requested by the user terminal 40 to the camera 20 via the user terminal 40 (step S113).

The provision server 10 updates, in the registration data 152, the information of the trained model used by the camera 20 with the information of the transmitted trained model (step S014).

The camera 20 stores the trained model received via the user terminal 40 in the storage 25 (step S015).

3. Advantageous Effects

The provision system 1B according to the first modification is useful in a case where the user is more familiar with input and confirmation of information by the user terminal 40 than by the camera 20, or in a case where data communication of the user terminal 40 is stable.

Second Modification

Figure 11:
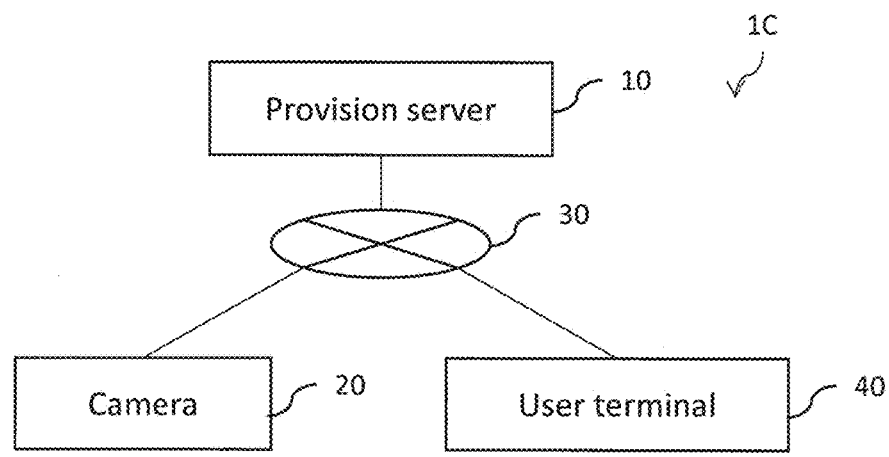
FIG. 11 is a schematic diagram illustrating a configuration of a provision system according to a second modification.

FIG. 11 is a schematic diagram illustrating a provision system 1C according to a second modification. In the provision system 1A according to the second embodiment described above, retraining of the trained model is performed in the camera 20. In contrast, in the provision system 1C according to the second modification, the retraining is performed in the user terminal 40 connected to the camera 20.

Therefore, each of the processes such as generation of training data, retraining, and provision of a trained model that are performed by the controller 21 described in the second embodiment may be performed by the controller 41 of the user terminal 40. In this case, the controller 41 generates the training data 254, using the captured image 252 and/or the photographing-related information 253 stored in the storage 25 of the camera 20. The new trained model 251 may be transmitted from the user terminal 40 to the provision server 10. Furthermore, the new trained model 251 may be transmitted from the camera 20 to the provision server 10.

The provision system 1C according to the second modification is useful in a case where a processing capacity or operability of the camera 20 are not sufficient for image selection and retraining.

Third Modification

Figure 12:
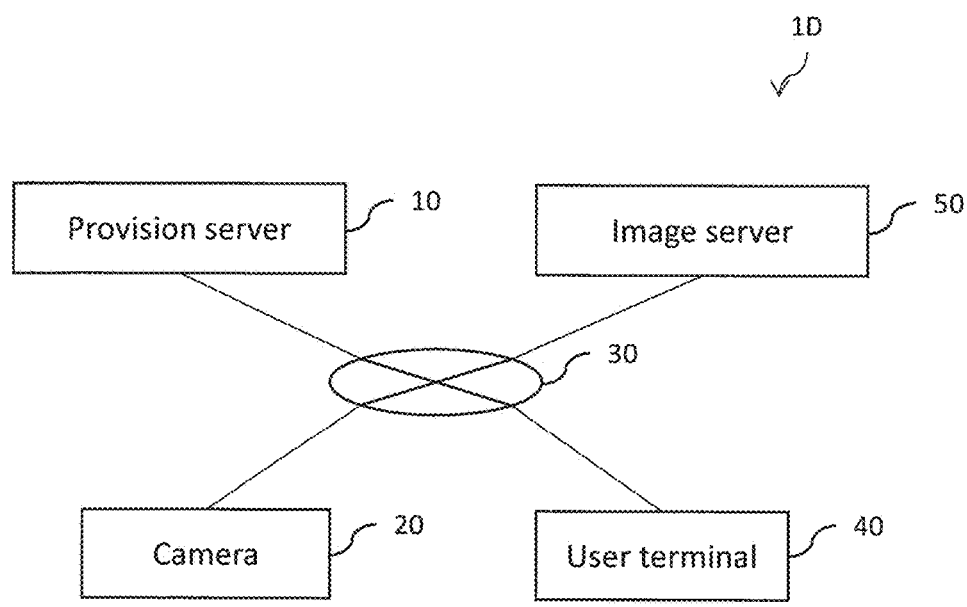
FIG. 12 is a schematic diagram illustrating a configuration of a provision system according to a third modification.

FIG. 12 is a schematic diagram illustrating a provision system 1D according to a third modification. In the provision system 1D according to the third modification, the provision server 10 can generate a new trained model using a captured image and photographing-related information obtained by the target camera 20. At this time, as described above in the second embodiment, the camera 20 can provide only the selected image and the photographing-related information to the provision server 10 as the training data. Furthermore, the image and the photographing-related information may be stored in an image server 50 as illustrated in the drawing, instead of being transmitted from the camera 20 to the provision server 10. The image server 50 may also be a server that stores data for backup.

The provision system 1D according to the third modification is useful in a case where the processing capacity of the camera 20 or the user terminal 40 is not sufficient for retraining.

<<Outline of Embodiments>>

(1) An imaging device of the present disclosure includes:
a communication unit that connects via a communication network to a provision server that provides a trained model used for image capturing;
a connection unit that connects to a storage or an external storage so as to output data to the storage or the external storage; and
a controller,
wherein the storage or the external storage stores the trained model,
the controller can
transmit photographing-related information obtained in association with image capturing to the provision server via the communication unit at a predetermined timing, and
store, in the storage or the external storage, a new trained model transmitted from the provision server in response to the photographing-related information.

As a result, it is possible to use a trained model suitable for imaging by the imaging device.

(2) The controller of (1) may
receive, before receiving the new trained model, recommendation data including information of training data used to generate the new trained model, and
transmit to the provision server a request signal to request transmission of the new trained model, upon receiving an operation for transmission of the new trained model performed by a user using the recommendation data.

As a result, the imaging device can acquire only a further preferable trained model.

(3) The controller of (1) or (2) may
analyze the photographing-related information,
display, before transmitting the photographing-related information to the provision server, an analysis result of the photographing-related information on a display unit, and
transmit to the provision server the photographing-related information, upon receiving an operation performed by a user to transmit the photographing-related information.

As a result, the imaging device can acquire a further preferable trained model by transmitting no unnecessary photographing-related information.

(4) In the imaging device of (1) to (3), the imaging device may
receive an operation signal by the user for change with respect to the analysis result, and
transmit, upon receiving the operation signal for change, information changed in accordance with the operation signal to the provision server as the photographing-related information.

As a result, the imaging device can acquire a further preferable trained model by transmitting necessary photographing-related information.

(5) The controller of (1) to (4) may
perform machine learning to generate a new trained model by using, as new training data, the photographing-related information stored in the storage or the external storage, and store the new trained model having been generated, in the storage or the external storage.

As a result, it is possible to generate a further preferable trained model in the imaging device by using the photographing-related information based on image capturing by the imaging device.

(6) The controller of (5) may transmit the new trained model having been generated to the provision server.

As a result, the trained model generated by the imaging device can be widely provided to other imaging devices.

(7) The controller of (5) or (6) may
display the photographing-related information stored in the storage or the external storage, and
generate a new trained model by using, as new training data, photographing-related information selected by a user from the displayed photographing-related information.

As a result, the imaging device can generate a trained model, using selected photographing-related information.

(8) The controller of (6) may
acquire, from the provision server, a new trained model generated in a past by another imaging device used by a user of the imaging device; and
store the acquired new trained model in the storage or the external storage.

As a result, the user of the imaging device can use, on the new imaging device that the user purchased, the trained model that the user used before purchasing the new imaging device.

(9) A provision server of the present disclosure includes:
a communication unit that connects to an imaging device via a communication network;
a storage that stores a plurality of trained models used for image capturing and information of training data used to generate each of the trained models while associating the trained models and the information of the training data with each other; and
a controller,
wherein the controller can
acquire photographing-related information that is obtained in association with image capturing and is transmitted from the imaging device via the communication unit,
select, from the plurality of trained models stored in the storage, a trained model that is associated with training data whose information includes the obtained photographing-related information, and
transmit the selected trained model to the imaging device via the communication unit.

As a result, it is possible to provide a trained model suitable for photographing by the imaging device.

(10) The controller of (9) may
transmit, before transmitting the trained model to the imaging device, recommendation data including information associated with the selected trained model to the imaging device via the communication unit, and
transmit, upon receiving a request signal that is transmitted from the imaging device via the communication unit and requests transmission of a trained model in response to the recommendation data, the trained model to the imaging device.

As a result, a further preferable trained model can be provided to the imaging device.

(11) The training data of (9) or (10) includes an image, and
the controller may acquire, from an external terminal connected via the communication unit, a new trained model generated by the external terminal and information obtained in association with capturing of an image included in training data used for the new trained model, and
store, in the storage, the acquired new trained model and information obtained in association with the capturing of the image in association with each other.

As a result, a new trained model can be stored in the storage device.

(12) The controller of (9) to (11) may
acquire new training data from an external terminal connected via the communication unit,
generate a new trained model by using the new training data, and
store, in the storage, the generated new trained model in association with information obtained in association with capturing of an image included in the new training data.

As a result, a trained model can be generated using training data generated by the imaging device.

INDUSTRIAL APPLICABILITY

The imaging device of the present disclosure is useful for acquiring or providing a trained model used at the time of image capturing.

What is claimed is:
1. An imaging device comprising:
a communication unit that connects via a communication network to a provision server that provides a trained model used for image capturing;
a connection unit that connects to a storage or an external storage so as to output data to the storage or the external storage; and
a controller,
wherein
the storage or the external storage stores the trained model, and
the controller
transmits photographing-related information obtained in association with image capturing to the provision server via the communication unit at a predetermined timing, and
stores, in the storage or the external storage, a new trained model transmitted from the provision server in response to the photographing-related information.

2. The imaging device according to claim 1, wherein the controller
receives, before receiving the new trained model, recommendation data including information of training data used to generate the new trained model, and
transmits to the provision server a request signal to request transmission of the new trained model, upon receiving an operation for transmission of the new trained model performed by a user using the recommendation data.

3. The imaging device according to claim 1, wherein the controller
analyzes the photographing-related information,
displays, before transmitting the photographing-related information to the provision server, an analysis result of the photographing-related information on a display unit, and transmits to the provision server the photographing-related information, upon receiving an operation performed by a user to transmit the photographing-related information.

4. The imaging device according to claim 3, wherein the imaging device
receives an operation signal by the user for change with respect to the analysis result, and
transmits, upon receiving the operation signal for change, information changed in accordance with the operation signal to the provision server as the photographing-related information.

5. The imaging device according to claim 1, wherein the controller
performs machine learning to generate a new trained model by using, as new training data, the photographing-related information stored in the storage or the external storage, and
stores the new trained model having been generated, in the storage or the external storage.

6. The imaging device according to claim 5, wherein the controller transmits the new trained model having been generated to the provision server.

7. The imaging device according to claim 6, wherein the controller
acquires, from the provision server, a new trained model generated in a past by another imaging device used by a user of the imaging device, and
stores the acquired new trained model in the storage or the external storage.

8. The imaging device according to claim 5, wherein the controller
displays the photographing-related information stored in the storage or the external storage, and
generates a new trained model by using, as new training data, photographing-related information selected by a user from the displayed photographing-related information.

9. A provision server comprising:
a communication unit that connects to an imaging device via a communication network;
a storage that stores a plurality of trained models used for image capturing and information of training data used to generate each of the trained models while associating the trained models and the information of the training data with each other; and
a controller,
wherein the controller
acquires photographing-related information that is obtained in association with image capturing and is transmitted from the imaging device via the communication unit,
selects, from the plurality of trained models stored in the storage, a trained model that is associated with training data whose information includes the obtained photographing-related information, and
transmits the selected trained model to the imaging device via the communication unit.

10. The provision server according to claim 9, wherein the controller
transmits, before transmitting the trained model to the imaging device, recommendation data including information associated with the selected trained model to the imaging device via the communication unit, and
transmits, upon receiving a request signal that is transmitted from the imaging device via the communication unit and requests transmission of a trained model in response to the recommendation data, the trained model to the imaging device.

11. The provision server according to claim 9, wherein the training data includes an image, and
the controller
acquires, from an external terminal connected via the communication unit, a new trained model generated by the external terminal and information obtained in association with capturing of an image included in training data used for the new trained model, and
stores, in the storage, the acquired new trained model and information obtained in association with the capturing of the image in association with each other.

12. The provision server according to claim 9, wherein the controller
acquires new training data from an external terminal connected via the communication unit,
generates a new trained model by using the new training data, and
stores, in the storage, the generated new trained model in association with information obtained in association with capturing of an image included in the new training data.

* * * * *